US012641286B2

(12) United States Patent
He et al.

(10) Patent No.: US 12,641,286 B2
(45) Date of Patent: May 26, 2026

(54) GEOMETRY CONVERSION FOR 360-DEGREE VIDEO CODING

(71) Applicant: InterDigital VC Holdings, Inc., Wilmington, DE (US)

(72) Inventors: Yuwen He, San Diego, CA (US); Yan Ye, San Diego, CA (US); Ahmed Hamza, Coquitlam (CA)

(73) Assignee: InterDigital VC Holdings, Inc., Wilmington, DE (US)

( * ) Notice: Subject to any disclaimer, the term of this patent is extended or adjusted under 35 U.S.C. 154(b) by 35 days.

(21) Appl. No.: 18/240,174

(22) Filed: Aug. 30, 2023

(65) Prior Publication Data

US 2023/0412839 A1     Dec. 21, 2023

Related U.S. Application Data

(63) Continuation of application No. 16/301,998, filed as application No. PCT/US2017/034516 on May 25, 2017, now Pat. No. 11,778,231.

(Continued)

(51) Int. Cl.
H04N 19/597 (2014.01)
H04N 19/186 (2014.01)
(Continued)

(52) U.S. Cl.
CPC ......... H04N 19/597 (2014.11); H04N 19/186 (2014.11); H04N 19/59 (2014.11); H04N 19/82 (2014.11)

(58) Field of Classification Search
CPC .... H04N 19/176; H04N 19/70; H04N 19/186; H04N 19/117; H04N 19/159;
(Continued)

(56) References Cited

U.S. PATENT DOCUMENTS

| | | |
|---|---|---|
| 2007/0160153 A1 | 7/2007 | Sullivan |
| 2011/0074931 A1 | 3/2011 | Bilbrey et al. |

(Continued)

FOREIGN PATENT DOCUMENTS

| | | |
|---|---|---|
| WO | 2017/051072 A1 | 3/2017 |
| WO | 2017/093611 A1 | 6/2017 |

OTHER PUBLICATIONS

"VR Coaster", Available at http://www.vrcoaster.com/, 2014, 7 pages.

(Continued)

*Primary Examiner* — Farhan Mahmud

(74) *Attorney, Agent, or Firm* — Condo Roccia Koptiw LLP

(57) ABSTRACT

Processing a 360-degree video content for video coding may include receiving the video content in a first geometry. The video content may include unaligned chroma and luma components associated with a first chroma sampling scheme. The unaligned chroma and luma components may be aligned to a sampling grid associated with a second chroma sampling scheme that has aligned chroma and luma components. A geometric conversion to the video content may be performed. The video content, that may comprise the aligned chroma and luma components, in the first geometry may be converted to a second geometry. The first geometry may be a stitched geometry, and the second geometry may be a coding geometry. The converted video content in the second geometry may include the chroma and luma components aligned to the sampling grid associated with the second chroma sampling scheme.

20 Claims, 30 Drawing Sheets

Related U.S. Application Data

(60) Provisional application No. 62/342,089, filed on May 26, 2016.

(51) Int. Cl.
   *H04N 19/59*    (2014.01)
   *H04N 19/82*    (2014.01)

(58) Field of Classification Search
   CPC ...... H04N 19/59; H04N 19/61; H04N 19/184; H04N 19/597; H04N 19/85
   See application file for complete search history.

(56)                References Cited

U.S. PATENT DOCUMENTS

| | | | |
|---|---|---|---|
| 2015/0172616 A1 | 6/2015 | Ye et al. | |
| 2015/0195573 A1* | 7/2015 | Aflaki Beni ......... | H04N 19/513 375/240.16 |
| 2016/0142697 A1* | 5/2016 | Budagavi ............. | H04N 13/106 348/43 |

OTHER PUBLICATIONS

Abbas, Adeel, "GoPro Test Sequences for Virtual Reality Video Coding", JVET-C0021, GoPro, Joint Video Exploration Team (JVET) of ITU-T SG 16 WP 3 and ISO/IEC JTC 1/SC 29/WG 11, 3rd Meeting: Geneva, CH, May 26-31, 2016, 10 pages.

Budagavi, et al., "360 Degrees Video Coding Using Region Adaptive Smoothing", IEEE International Conference on Image Processing (ICIP), 2015, pp. 750-754.

Choi, Byeongdoo, "Technologies under Consideration for Omnidirectional Media Application Format", ISO/IEC JTC1/SC29/WG11 N15946, San Diego, CA, US, Feb. 2016, 16 pages.

Facebook, "Facebook 360 Video", Available at https://facebook360. fb.com/, retrieved on Nov. 12, 2018, 13 pages.

Facebook, "Next-Generation Video Encoding Techniques for 360 Video and VR", Available at https://code.facebook.com/posts/1126354007399553/next-generation-video-encoding-techniques-for-360-video-and-vr/, Jan. 21, 2016, pp. 1-5.

GitHub, "Facebook's Equirectangular to Cube Map Tool on GitHub", Available at https://github.com/facebook/transform?files=1, retrieved on Nov. 9, 2018, 3 pages.

Google, "Google Cardboard", Available at https://www.google.com/get/cardboard/, retrieved on Nov. 9, 2018, 4 pages.

He et al., "Color Correction for HDR/WCG Coding", Inter Digital Communications, LLC, m37216, ISO/IEC JTC1/SC29/WG11, Geneva, CH, Oct. 2015, 9 pages.

HTC, "HTC Vive", Available at https://www.htcvive.com/us/, 2011, 3 pages.

ISO/IEC, "Requirements and Use Cases for Omnidirectional Media Application Format", Requirements, N15731, ISO/IEC JTC1/SC29/WG11, Geneva, Switzerland, Oct. 2015, 4 pages.

ISO/IEC, "Requirements for OMAF", Requirements, N16143, ISO/IEC JTC1/SC29/WG11, San Diego, CA, US, Feb. 2016, 2 pages.

ISO/IEC, "Description of 360 3D Video Application Exploration Experiments on Divergent Multi-View Video", Requirements, ISO/IEC JTC1/SC29/WG11 MPEG2015/ M16129, San Diego, US, Feb. 2016, 5 pages.

Li et al., "SCE1.2: Color Gamut Scalability with Asymmetric 3D LUT", Qualcomm Inc., InterDigital Communications, Inc., Technicolor, JCTVC—Q0048, Joint Collaborative Team on Video Coding (JCT-VC) of ITU-T SG 16 WP 3 and ISO/IEC JTC 1/SC 291WG 11, 17th Meeting: Valencia, ES Mar. 27-Apr. 4, 2014, 7 pages.

Norkin et al., "Call for Test Materials for Future Video Coding Standardization", ITU-T Q6/16 Visual Coding (VCEG), and ISO/IEC JTC1/SC29/WG11 Coding of Moving Pictures and Audio (MPEG), JVET-B1002, Joint Video Exploration Team (JVET) of ITU-T SG 16 WP 3 and ISO/IEC JTC 1/SC 29/WG 11, 2nd Meeting: San Diego, USA, 2nd Meeting: San Diego, USA, Feb. 20-26, 2016, 4 pages.

Oculus, "Oculus Rift", Available at <https://www.oculus.com/en-us/rift/>, retrieved on Nov. 9, 2018, 7 pages.

Thomas et al., "5G and Future Media Consumption", TNO, ISO/IEC JTC1/SC29/WG11 MPEG2016/m37604, San Diego, CA, US, Feb. 2016.

Youtube, "360 Video", Virtual Reality, Available at <https://www.youtube.com/channel/UCzuqhhs6NWbgTzMuM09WKDQ>, retrieved on Oct. 4, 2019, pp. 1-3.

* cited by examiner $U_3$ $U_7$ $U_{11}$ $U_{15}$ $U_2$  $D_1$ $U_6$ $U_{10}$ $D_3$ $U_{14}$ $U_1$ $U_5$ $U_9$ $U_{13}$ $U_0$  $D_0$ $U_4$ $U_8$  $D_2$ $U_{12}$

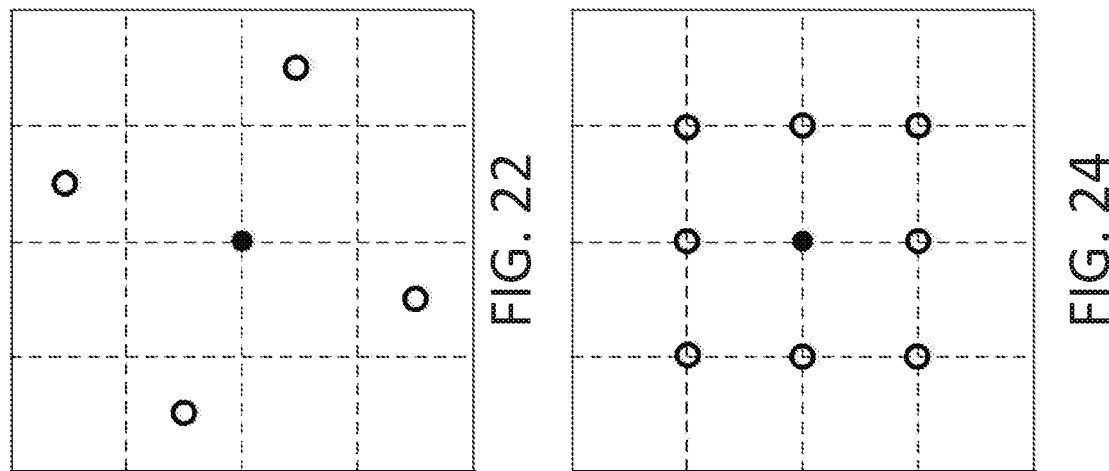
FIG. 22
FIG. 24
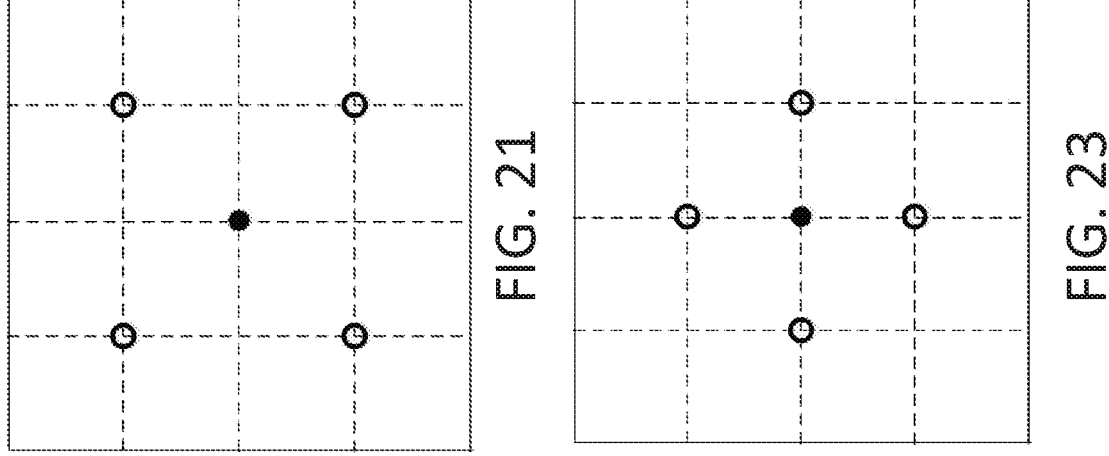
FIG. 21
FIG. 23

GEOMETRY CONVERSION FOR 360-DEGREE VIDEO CODING

CROSS-REFERENCE TO RELATED APPLICATIONS

This application is a Continuation Application of U.S. Non-Provisional application Ser. No. 16/301,998, filed Nov. 15, 2018, which is the National Stage Entry under 35 U.S.C. § 371 of Patent Cooperation Treaty Application No. PCT/ US2017/034516, filed May 25, 2017, which claims the benefit of U.S. Provisional Application Ser. No. 62/342,089 filed May 26, 2016, the contents of which are incorporated by reference herein, and this application claims benefit of the filing date of the priority application.

BACKGROUND

Virtual reality (VR) is starting to go out from research laboratories and into people's daily lives. VR has many application areas including, but not limited to, healthcare, education, social networking, industry design/training, game, movie, shopping, and entertainment. VR is gaining attention from industries and consumers because VR is capable of bringing an immersive viewing experience. VR may create a virtual environment surrounding the viewer and generate a true sense of being there for the viewer. A VR system may support interactions through posture, gesture, eye gaze, voice, or etc. A VR system may provide haptic feedback to the user and allow the user to interact with objects in the VR world in a natural way.

SUMMARY

Processing a 360-degree video content for video coding may include receiving the 360-degree video content in a first geometry. The 360-degree video content may comprise unaligned chroma and luma components associated with a first chroma sampling scheme. The 360-degree video content may be received by capturing the video content with multiple cameras and stitching the video content together to obtain the first geometry. The 360-degree video content may be received in a bitstream. The unaligned chroma and luma components of the 360-degree video content in the first geometry may be aligned to a sampling grid associated with a second chroma sampling scheme that has aligned chroma and luma components. In the second chroma sampling scheme, the chroma components may be overlaid with the luma components at the same sampling location. A geometric conversion to the 360-degree video content may be performed. The 360-degree video content, that may comprise the aligned chroma and luma components, in the first geometry may be converted to the second geometry. The converted 360-degree video content in the second geometry may include the chroma and luma components aligned to the sampling grid associated with the second chroma sampling scheme.

The first chroma sampling scheme may include at least one of a 4:2:0 chroma format with a Type-0, Type-1, or Type-3 chroma sample location. The second chroma sampling scheme may include at least one of a 4:4:4 chroma format, a 4:2:2 chroma format, or a 4:2:0 chroma format with a Type-2 chroma sample location. The first geometry may be a stitched geometry, and the second geometry may include a coding geometry. The first and the second geometry may include at least one of an equirectangular format or a cubemap format. While processing the 360-degree video content for video coding described herein are using an equirectangular and/or a cubemap format as an exemplary manner, those skilled in the art would appreciate that other formats, such as a unicube format, equal-area format, octahedron format, cylinder format, and the like, may be used interchangeably.

When the 360-degree video content in the first geometry is converted to the second geometry, an inverse realignment filter may be applied to restore the aligned chroma components of the second geometry back to having the unaligned chroma components associated with the first chroma sampling scheme. An indication in a bitstream may be produced, and the indication may be configured to indicate that the chroma components of the second geometry have been restored back to having the unaligned chroma components associated with the first chroma sampling scheme. A frame packing of the 360-degree video content may be performed in the second geometry having the first chroma sampling scheme.

A vertical phase shift of the first chroma sampling scheme to the second chroma sampling scheme may be performed to align the chroma components with the luma components vertically on a condition that the chroma components misalign vertically with the luma components. A horizontal phase shift of the first chroma sampling scheme to the second chroma sampling scheme may be performed to align the chroma components with the luma components horizontally on a condition that the chroma components misalign horizontally with the luma components. Both the horizontal phase shift and the vertical phase shift of the first chroma sampling scheme to the second chroma sampling scheme may be performed to align the chroma components with the luma components horizontally and vertically on a condition that the chroma components misalign both horizontally and vertically with the luma components. Aligning the unaligned chroma and luma components may comprise applying a filter having at least one of a resampling filter or a phase alignment filter. The resampling filter comprises at least one of a chroma upsampling filter or an interpolation filter.

Aligning the unaligned chroma/luma components may comprise one or more of the following, respectively. A current chroma/luma sample may be determined at a current chroma/luma sample location that is associated with a padding chroma/luma sample outside of a video content boundary. A padding chroma/luma sample location may be derived, and the padding chroma % luma sample location may be associated with the padding chroma/luma sample that is spherically continuous of the current chroma/luma sample location based on the first geometry. A padding chroma/luma sample value at the padding chroma/luma sample location may be derived for aligning the chroma/ luma components.

Aligning the unaligned chroma/luma components may comprise one of more of the following, respectively. A padding chroma/luma sample associated with a current chroma/luma sample may be determined if the padding chroma/luma sample is outside of a video content face. A 3D position of a padding chroma/luma sample may be calculated. A 2D planar position may be identified by applying a geometry projection with the 3D position of the padding chroma/luma sample to the first geometry. The padding sample chroma/luma value at the identified 2D planar position may be derived for aligning the chroma/luma components.

BRIEF DESCRIPTION OF THE DRAWINGS

A more detailed understanding of the embodiments disclosed herein may be had from the following description, given by way of example in conjunction with the accompanying drawings.

FIG. 21 shows a square 2×2 neighbor sample pattern.

FIG. 22 shows a rotated grid super sampling (RGSS) neighbor sample pattern.

FIG. 23 shows a diamond neighbor sample pattern.

FIG. 24 shows a square 3×3 neighbor sample pattern.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

VR systems may use 360-degree video and may provide a user the capability to view a scene from 360-degree angles in the horizontal direction and 180-degree angles in the vertical direction. VR and 360-degree video may be used for media consumption beyond Ultra High Definition (UHD) service. Free view TV (FTV) may test the performance of solutions (e.g., a 360-degree video (omnidirectional video) based system and a multi-view based system).

VR systems may include a processing chain including, but not limited to capturing, processing, display, and/or applications. VR capturing may use a multiple camera system to capture a scene from different divergent views (e.g., 6-12 views). The views may be stitched together and may form a 360-degree video in high resolution (e.g., 4K or 8K). On the client or user side, a VR system may include a computation platform, a head mounted display (HMD), and/or head tracking sensors. A computation platform may receive, decode (e.g., a 360-degree video), and generate a viewport for display. Two pictures, one for each eye, may be rendered for the viewport. The two pictures may be displayed in HMD for stereo viewing. The lens may be used to magnify the image displayed in HMD for better viewing. The head tracking sensor may track (e.g., constantly track) the viewer's head orientation and may feed orientation information to the system to display the viewport picture for that orientation. A VR system may provide a touch device for a viewer to interact with objects in the virtual world.

Figure 1:
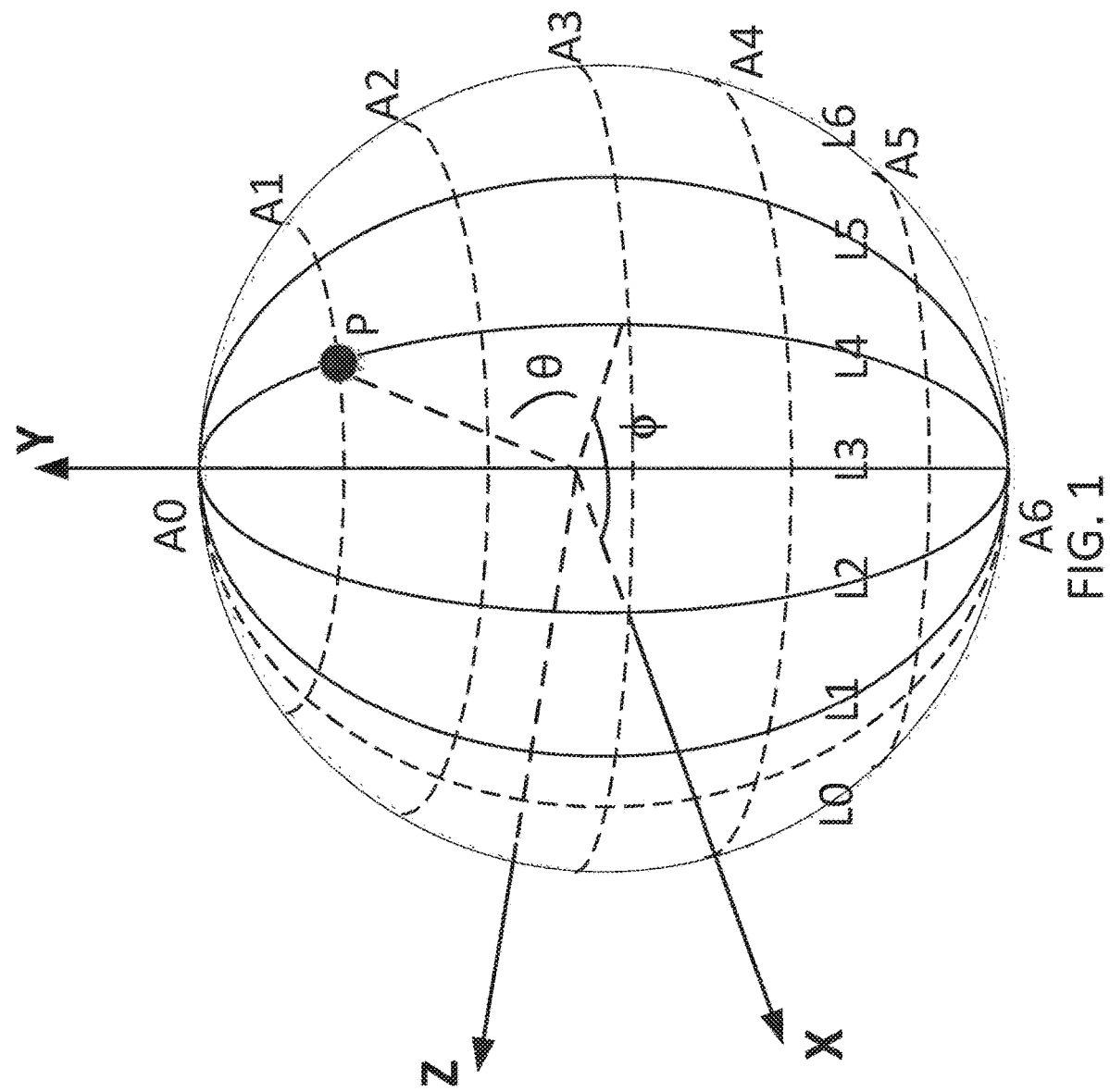
FIG. 1 shows an example sphere sampling in longitudes (φ) and latitudes (θ).
Figure 2:
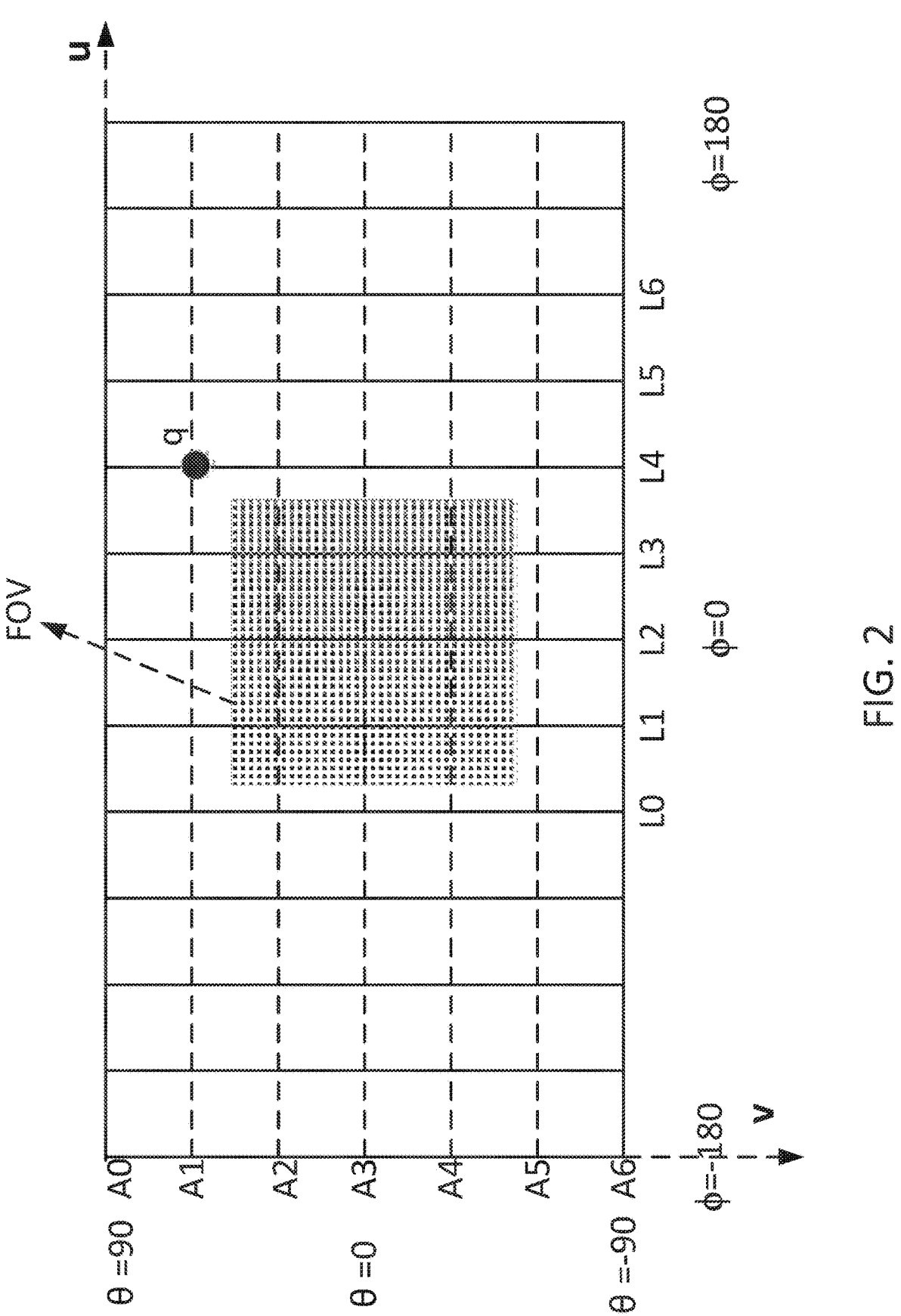
FIG. 2 shows the sphere of FIG. 1 being projected to a 2D plane using equirectangular projection.

360-degree video delivery may represent 360-degree information with a sphere geometry structure. Synchronized multiple views may be captured by multiple cameras and may be stitched on a sphere (e.g., as one integral structure). The sphere information may be projected to a 2D planar surface and may use a given geometry conversion process (e.g., using the equirectangular projection method). A geometry conversion process may include converting a 360-degree video from an image format (e.g., an equirectangular image format) to another image format (e.g., cubemap image format). FIG. 1 shows an example sphere sampling in longitudes ($\phi$) (e.g., L0-L6) and latitudes ($\theta$) (e.g., A0-A6). FIG. 2 shows the sphere of FIG. 1 being projected to a 2D plane using equirectangular projection. The longitude $\phi$ in the range $[-\pi, \pi]$ is known as yaw, and latitude $\theta$ in the range $[-\pi/2, \pi/2]$ is known as pitch in aviation, where n is the ratio of a circle's circumference to its diameter. (x, y, z) is used to represent a point's coordinates in 3D space, and (ue, ve) is used to represent a point's coordinates in a 2D plane. Equirectangular projection may be represented mathematically in Equations (1) and (2):

$$ue = (\phi/(2*\eta)+0.5)*W \qquad (1)$$

$$ve = (0.5-\theta/\pi)*H \qquad (2)$$

W and H are the width and height of the 2D planar picture. As shown in FIG. 1, the point P, the cross point between longitude L4 and latitude A1 on the sphere, is mapped to a unique point q in FIG. 2 in the 2D plane using Equations (1) and (2). The point q of FIG. 2 in a 2D plane may be projected back to the point P on the sphere of FIG. 1 via inverse projection. The field of view (FOV) in FIG. 2 shows an example that the FOV in a sphere is mapped to 2D plane with the view angle along the X axis being about 110 degree.

Figure 3:
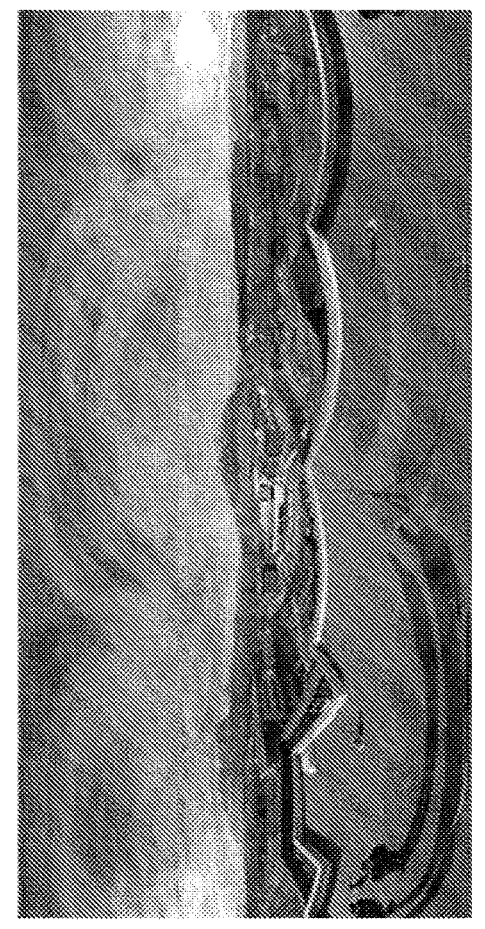
FIG. 3 shows an example equirectangular picture.
Figure 4:
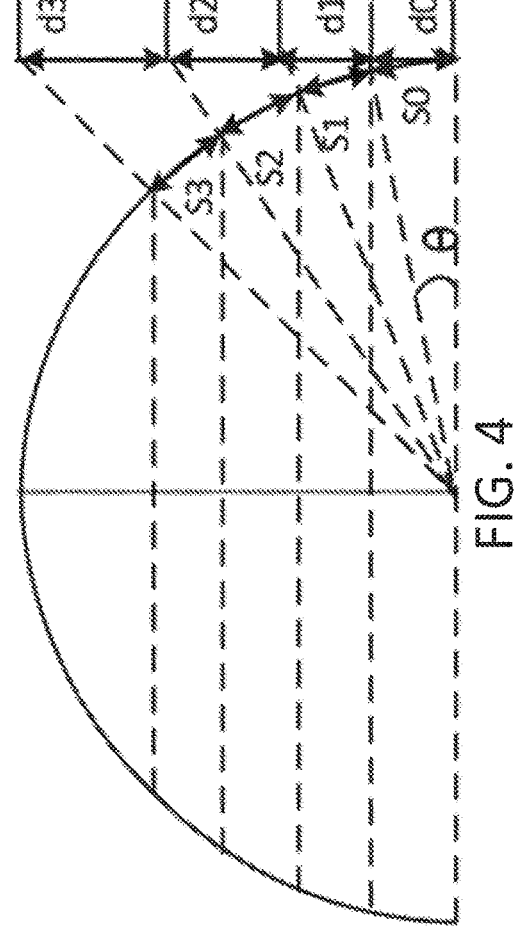
FIG. 4 shows the warping effect for sampling with equal latitude interval in a sphere.

With equirectangular projection, 2D planar pictures may be treated as a 2D video. The video may be encoded with a video codec (e.g., H.264 or high efficiency video coding (HEVC)) and may be delivered to a client. At the client side, the equirectangular video may be decoded and may be rendered (e.g., based on a user's viewport by projecting and displaying a portion of FOV in the equirectangular picture onto the HMD). Spherical video may be transformed to a 2D planar picture for encoding with equirectangular projection. The characteristic of equirectangular 2D picture may be different from a 2D picture (e.g., called rectilinear video). FIG. 3 shows an example equirectangular picture. The top portion of the picture corresponds to the North Pole, and the bottom portion corresponds to the South Pole, and they are stretched (e.g., indicating that the equirectangular sampling in the 2D spatial domain is uneven). FIG. 4 shows the warping effect if sampling with equal latitude interval in a sphere is applied. The sampling intervals S0, S1, S2 and S3 may be equal in latitude. The spatial distances d0, d1, d2 and d3 may indicate that the distance, when they are projected onto the 2D plane, are different. The objects near the pole areas may be squashed in the vertical direction. If an object translationally moves from the equator to a pole on the sphere, the shape of the object may be changed as the object moves across the corresponding positions on the 2D plane after equirectangular projection. The motion field corresponding to this object in the 2D plane in the temporal direction may be complex. Certain video codec (e.g., MPEG-2, H.264 or HEVC) may use a translational model to describe a motion field and may not efficiently represent this shape varying movement. With equirectangular projection, areas closer to the poles may be less interesting for viewers and/or content providers as compared to the areas closer to the equator (e.g., the viewer may not focus on the top and bottom regions for a long duration). Based on the warping effect, the pole areas are stretched to become a large portion of the 2D plane after equirectangular project and compressing these regions may take a lot of bits. Pre-processing (e.g., smoothing the pole areas) to reduce bandwidth may be used for equirectangular picture coding. Different geometric structures may be used to represent a 360-degree video (e.g., cubemap, cylinder, pyramid, or etc.). The cubemap has 6 faces, each of the faces being a planar square.

Figure 5:
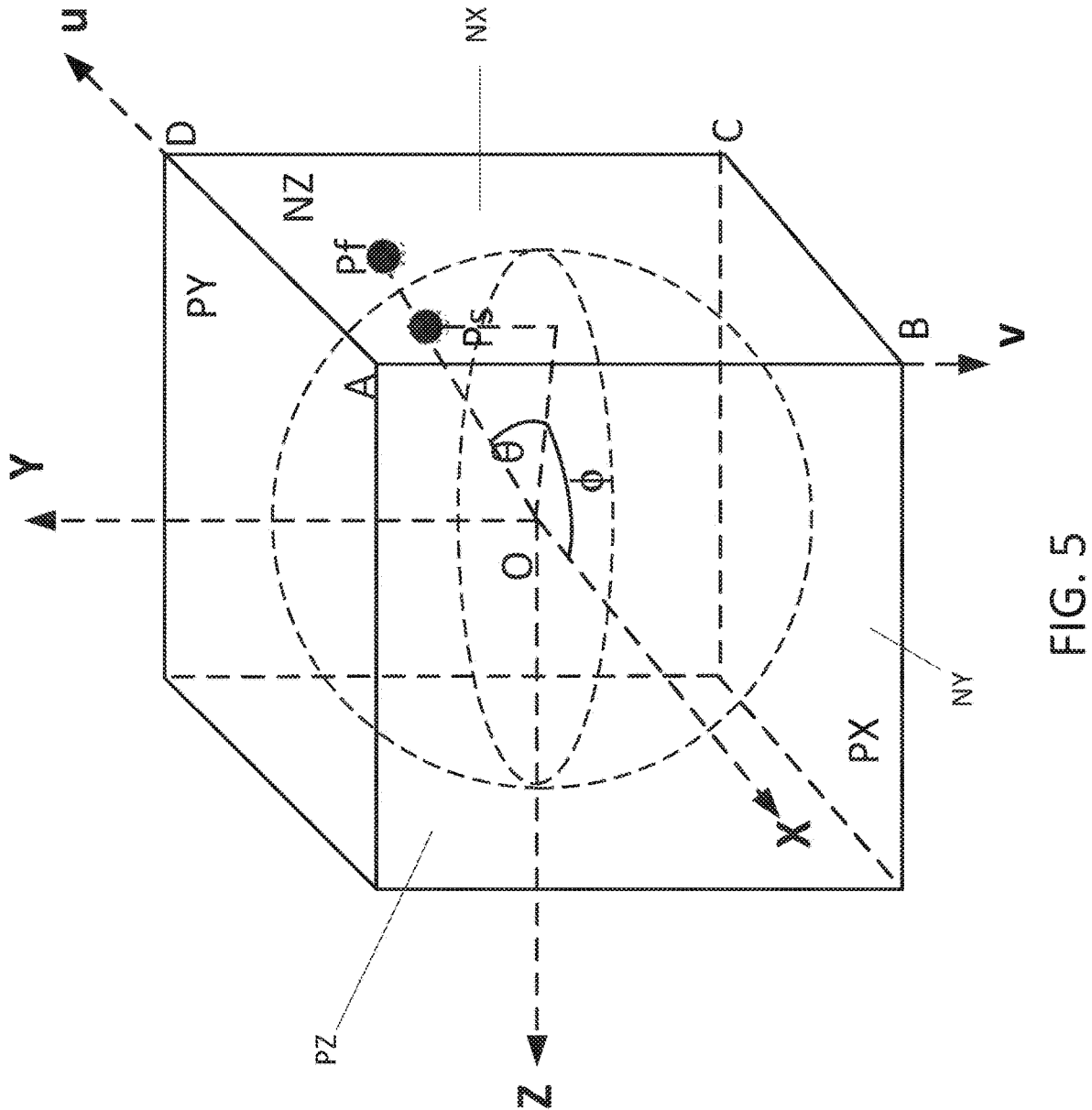
FIG. 5 shows a sphere geometry representation with a cubemap projection.

Equirectangular format may be supported with 360-degree cameras and stitching software. Encoding a 360-degree video in cubemap geometry may use conversion of equirectangular format to cubemap format. There is a relationship between equirectangular and cubemap. In FIG. 5, there are six faces (e.g., PX (0), NX (1), PY (2), NY (3), PZ (4), NZ (5)) and three axes (e.g., X, Y, Z) going from the center of sphere (e.g., O) to the center of a face. P stands for positive and N stands for negative. PX means the direction along positive X axis from the center of sphere, and NX is the reverse direction of PX. Similar notations may be used for PY, NY, PZ, and NZ. There are six faces (e.g., PX, NX, PY, NY, PZ, NZ) corresponding to the front, back, top, bottom, left, and right faces, respectively. The faces may be indexed from 0 to 5 (e.g., PX (0), NX (1), PY (2), NY (3), PZ (4), NZ (5)). Ps (X_s, Y_s, Z_s) may be a point on the sphere with a radius being 1. Ps may be represented in yaw $\phi$ and pitch $\theta$ as follows:

$$X\_s = \cos(\theta)\cos(\phi) \qquad (3)$$

$$Y\_s = \sin(\theta) \qquad (4)$$

$$Z\_s = -\cos(\theta)\sin(\phi) \qquad (5)$$

Pf may be a point on the cube when extending the line from the sphere center to Ps, and Pf may be on face NZ. The coordinates of Pf, (X_f, Y_f, Z_f), may be calculated as:

$$X\_f = X\_s/|Z\_s| \qquad (6)$$

$$Y\_f = Y\_s/|Z\_s| \qquad (7)$$

$$Z\_f = -1 \qquad (8)$$

where |x| is the absolute value of variable x. The coordinates of Pf (uc, vc), in the 2D plane of face NZ may be calculated as:

$$uc = W*(1-X\_f)/2 \qquad (9)$$

$$vc = H*(1-Y\_f)/2 \qquad (10)$$

Using equations (3) to (10), there is a relationship between the coordinates (uc, vc) in cubemap on a particular face and the coordinates ($\phi$, $\theta$) on the sphere. The relationship between equirectangular point (ue, ve) and the point ($\phi$, $\theta$) on the sphere may be known from Equations (1) and (2). There is a relationship between equirectangular geometry and cubemap geometry. The geometry mapping from cubemap to equirectangular may be expressed as follows. Given the point (uc, vc) on one face on a cubemap, the output (ue, ve) on the equirectangular plane may be calculated as follows. The coordinates of 3D point P_f on the face may be calculated with (uc, vc) according to the relationship in Equations (9) and (10). The coordinates of 3D point P_s on the sphere may be calculated with P_f according to the relationship in Equations (6), (7) and (8). The (0, 8) on the sphere may be calculated with P_s according to the relationship in Equations (3), (4) and (5). The coordinates of the point (ue, ve) on the equirectangular picture may be calculated from (4, 8) according to the relationship in Equations (1) and (2).

Figure 6:
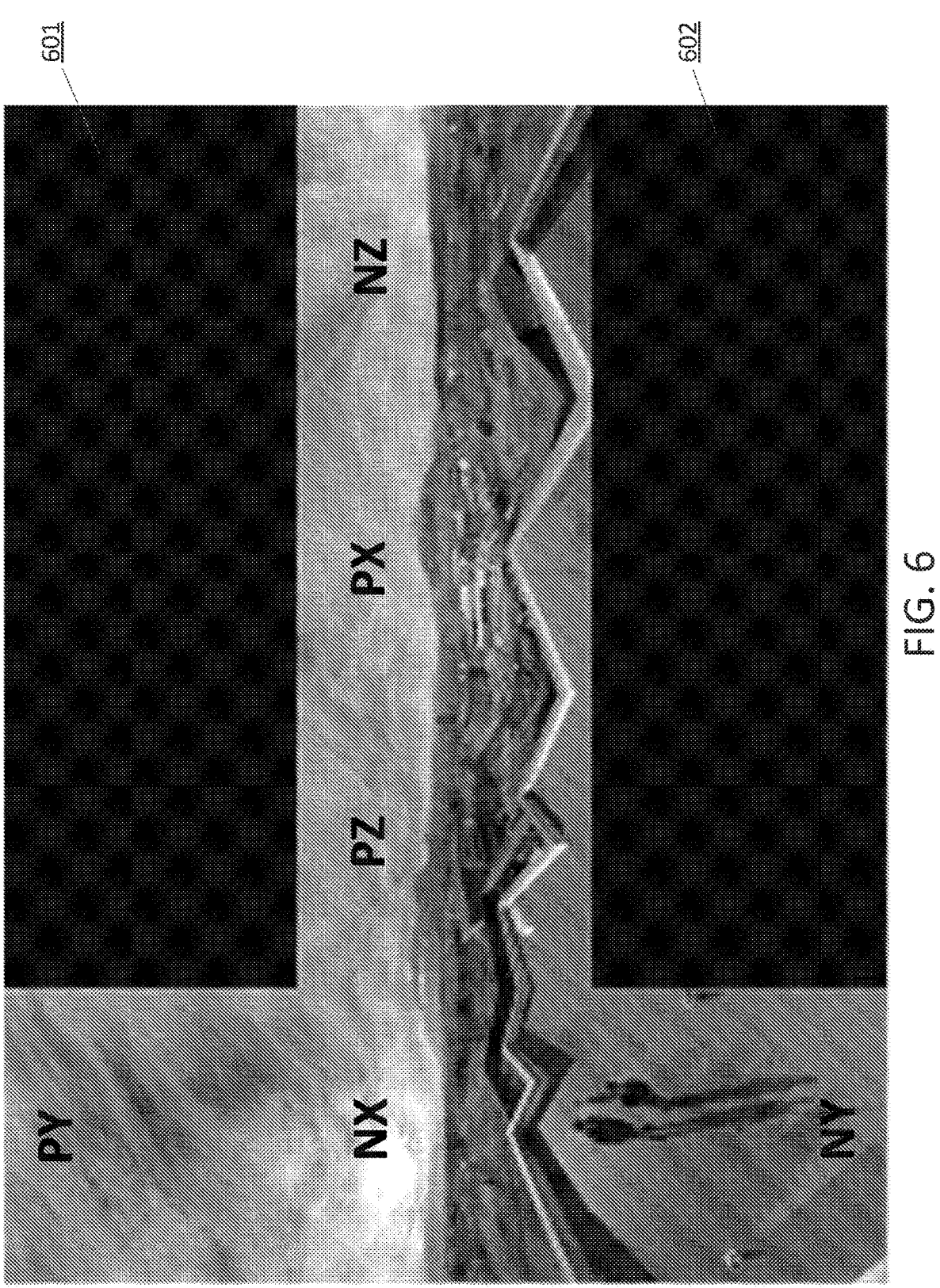
FIG. 6 shows an example of 4×3 frame packed picture with cubemap projection that corresponds to the equirectangular picture in FIG. 3.

In order to represent a 360-degree video in one 2D picture using cubemap, the six faces of the cubemap may be packed into one rectangular area. This may be referred to as frame packing. The frame packed pictures may be treated (e.g., coded) as one 2D picture. Different frame packing configurations may be used (e.g., 3×2 or 4×3). In a 3×2 configuration, the six cubemap faces may be packed into 2 rows, with 3 faces in one row. In a 4×3 configuration, the 4 faces (e.g., PX, NZ, NX, PZ) may be packed into one row (e.g., the center row), and the faces PY and NY may be packed (e.g., separately) into two different rows (e.g., the top and bottom rows). FIG. 6 shows an example of 4×3 frame packed picture with cubemap projection that corresponds to the equirectangular picture in FIG. 3.

A 360-degree video in equirectangular format may be inputted and converted into cubemap format. For a sample position (uc, vc) in cubemap format, the corresponding coordinates (ue, ve) in equirectangular format may be calculated. If the calculated coordinates (ue, ve) in equirectangular are not at an integer sample position, an interpolation filter may be used (e.g., obtaining a sample value at this fractional position using samples from the neighboring integer positions).

As shown in FIG. 6, using cubemap, the warping effects in equirectangular format (e.g., the sky (North pole) and ground (South pole) are stretched in FIG. 3) may be avoided (e.g., within each face, the object is the same as a 2D picture without warping). Using a 4×3 frame packing for cubemap, the cubemap faces may be placed in a spatially continuous manner. For example, 6 sub-pictures corresponding to 6 faces in the cubemap may be shown in FIG. 6. Parts 601 and 602 without a picture may be padded regions to fill in the rectangular picture.

Figure 7:
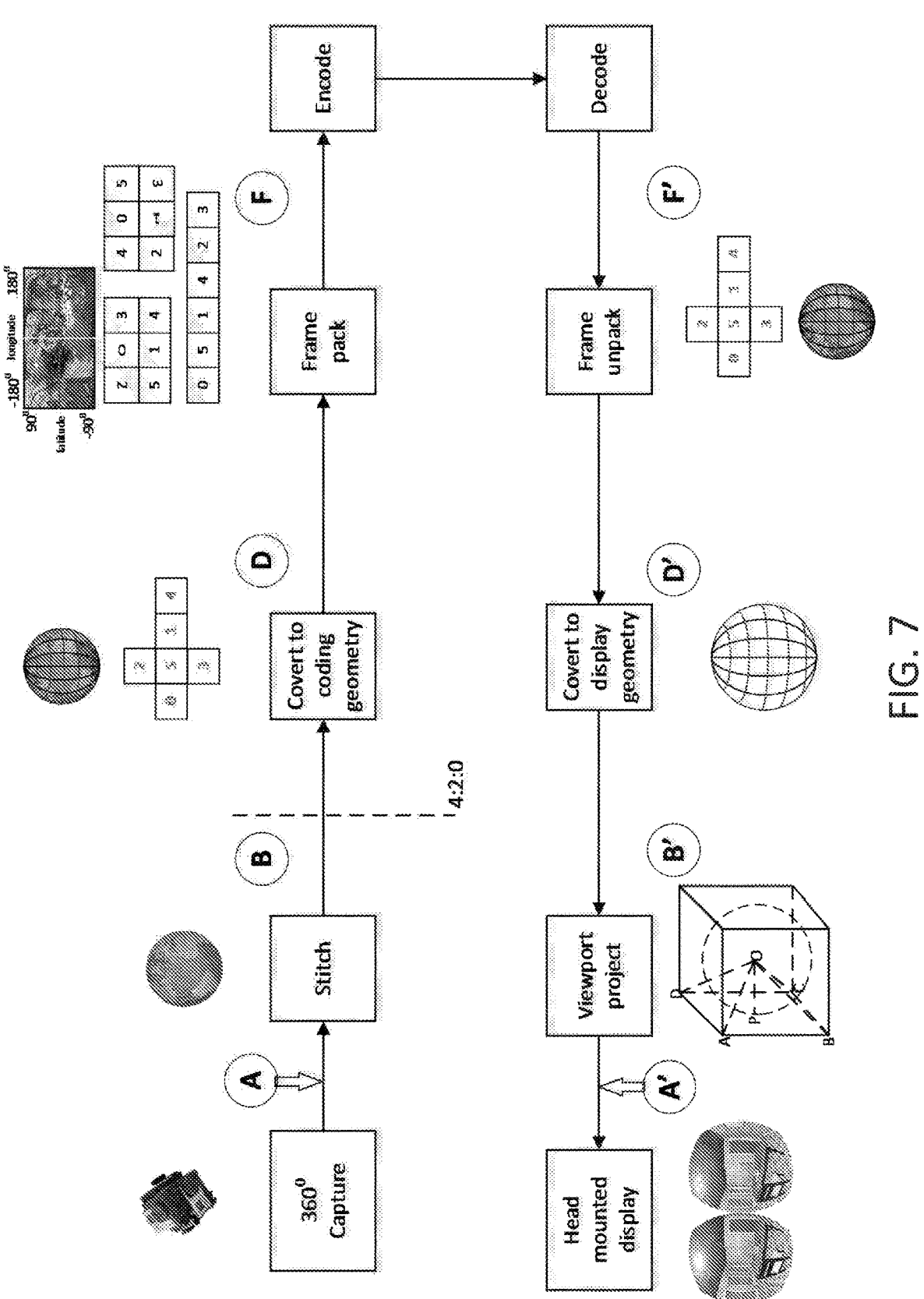
FIG. 7 depicts a work flow for a 360-degree video system.

FIG. 7 depicts an example work flow for a 360-degree video system. For example, FIG. 7 may capture a 360-degree video using multiple cameras. The captured videos may cover the spherical space. The videos may be stitched together in a first geometry. The first geometry may be a stitched geometry. The stitched geometry may be in an equirectangular format. For example, the videos may be stitched to generate a video in an equirectangular geometry format. The equirectangular geometry structure may be converted to another, a second geometry structure. The second geometry may be a coding geometry, which may be for encoding (e.g., encoding with video codecs). The coding geometry may be in a cubemap format. For example, the equirectangular geometry structure may be converted to a cubemap geometry format for encoding (e.g., encoding with video codecs). The coded video may be delivered to the client via, for example dynamic streaming or broadcasting. The video may be decoded, for example at the receiver. The decompressed frame may be unpacked to a geometry such as a display geometry. The decompressed frame may be unpacked to an equirectangular geometry format. The geometry may be used for rendering. For example, the geometry may be used for rendering via viewport projection according to a user's viewing angle.

Chroma components may be subsampled to a smaller resolution than that of a luma component. Chroma subsampling may reduce the amount of video data used for encoding and may save bandwidth and/or computing power and may do so without affecting (e.g., significantly affecting) video quality. With a 4:2:0 chroma format, both of the chroma components may be subsampled to be ¼ of the luma resolution. For example, the chroma components may be subsampled ½ horizontally and ½ vertically of the luma resolution. After chroma subsampling, the chroma sampling grid may be different from the luma sampling grid. In FIG. 7, throughout the processing flow, the 360-degree video being processed at each stage may be in a chroma format where the chroma components have been subsampled.

Figure 13:
FIG. 13 shows an example sample grid relationship between luma and chroma sampling.
Figure 13:
Figure 13:

A 360-degree video may be converted from an equirectangular geometry to a cubemap geometry. The phase relationship between luma and chroma sampling grids may be preserved during geometry conversion. For example, for the 4:2:0 chroma format, a sampling grid relationship between luma and chroma may be shown in FIG. 13. As shown in FIG. 13, chroma may be located in the grid marked as Dx (e.g., $D_0$, $D_1$, . . . , $D_3$), and luma may be located in the grid marked as Ux (e.g., $U_0$, $U_1$, . . . , $U_{15}$). As shown in FIG. 13, the chroma sampling grid may be aligned with the luma sampling grid in the horizontal direction. The chroma sampling grid in FIG. 13 may be misaligned with the luma sampling grid in the vertical direction, and may have a sample offset (e.g., 0.5 sample offset) in the vertical direction. After conversion, the phase for the chroma grid relative to the luma sampling grid may be the same as that of before conversion. For example, after the conversion, the chroma and luma components may overlaid with the luma components at the same sampling grid location. The geometry conversion process may be modeled in the following way:

$$ve\_L = f(vc\_L) \tag{11}$$

where vc_L may be the vertical coordinate of the point on the cubemap of luma component, ve_L may be the vertical coordinate of the point on the equirectangular of luma component, and f( ) may be the geometry conversion function from cubemap to equirectangular. If the phase shift of chroma is $\Delta$ in the vertical direction, the chroma phase relative to luma may be kept unchanged before and after conversion.

$$vc\_C = vc\_L + \Delta \tag{12}$$

$$ve\_C = ve\_L + \Delta = f(vc\_L) + \Delta \tag{13}$$

where vc_C may be the vertical coordinate of the point on the cubemap of chroma component, ve_C may be the vertical coordinate of the point on the equirectangular of chroma component, and f( ) may be the geometry conversion function from cubemap to equirectangular. If luma and chroma are converted separately with the same geometry conversion process, the following chroma coordinate may be obtained.

$$ve\_C = f(vc\_C) = f(vc\_L + \Delta) \tag{14}$$

Equation (14) may or may not be equal to Equation (13) because the function f( ) is a non-linear process. If chroma and luma sampling grid are aligned, Equation (13) may be equal to Equation (14), which means a separate conversion may preserve the relative phase relationship. For example, chroma and luma sampling grid may be aligned if $\Delta$ is 0 for both horizontal and vertical directions.

Figure 8:
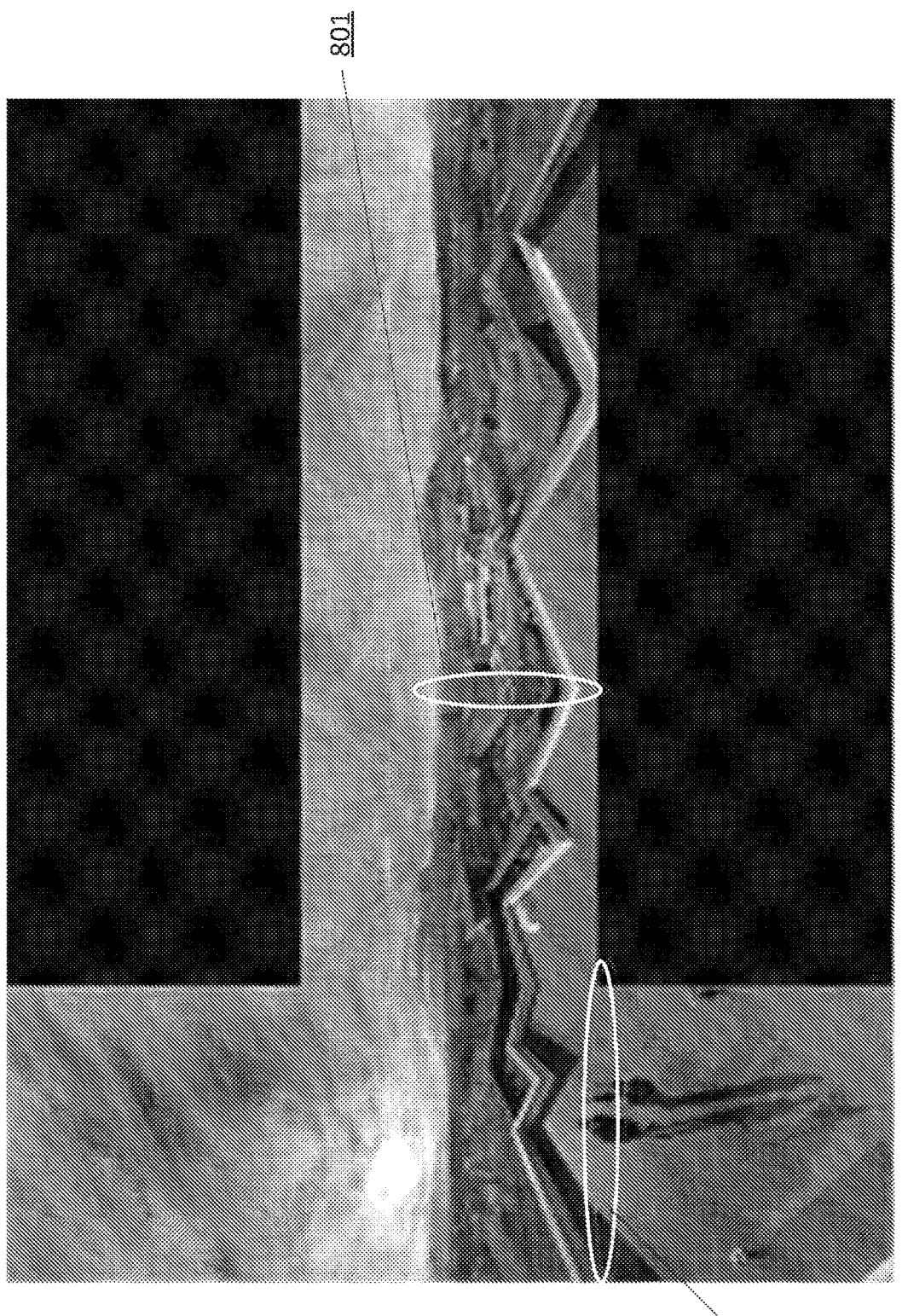
FIG. 8 depicts an example 4×3 frame packed cubemap converted from the equirectangular video in FIG. 3.
Figure 9:
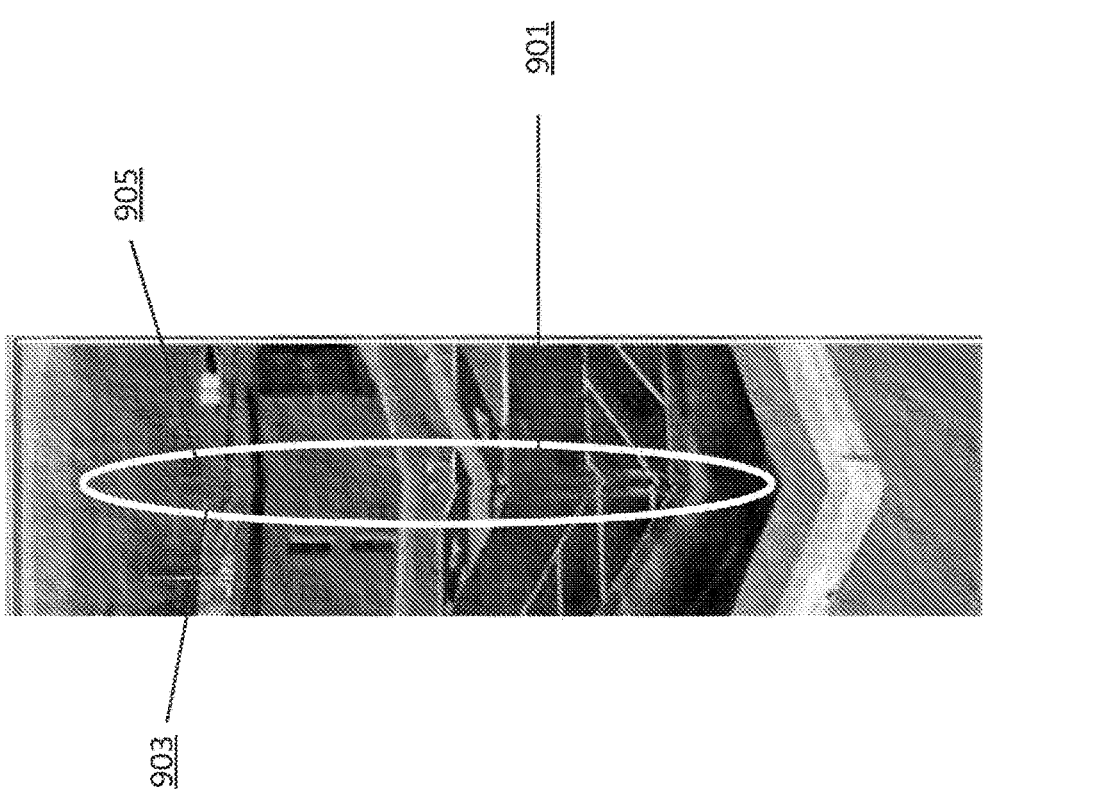
FIG. 9 illustrates an example magnified view of a portion of FIG. 8 (e.g., 801).

The sampling phase in the sampling grid for both geometries may be considered in the conversion. If the sampling phase is not handled correctly in either equirectangular or cubemap, it may cause boundary misalignment. FIG. 8 depicts an example 4×3 frame packed cubemap converted from the equirectangular video in FIG. 3, and the picture resolution is 2880×2160. A zoomed-in version of the vertical boundary misalignment at 801 between two cubemap faces may be shown in FIG. 9. The misalignment area may be marked by the ellipses 801 and 901. As shown in FIG. 9, one tree may appear on both sides at 903 and 905, and the image may look like two trees are there. A zoomed-in version of the horizontal boundary misalignment at 803 between two faces may be shown in FIG. 10. In the elliptically marked regions 803, 1002, 1004, 1006 and 1008, the lines 1010, 1012, 1014 and 1016 may not be aligned, and the person's chin 1018 may be repeated on both sides. This may be because of the processing of the phases of the sampling grids for equirectangular and cubemap.

Figure 11:
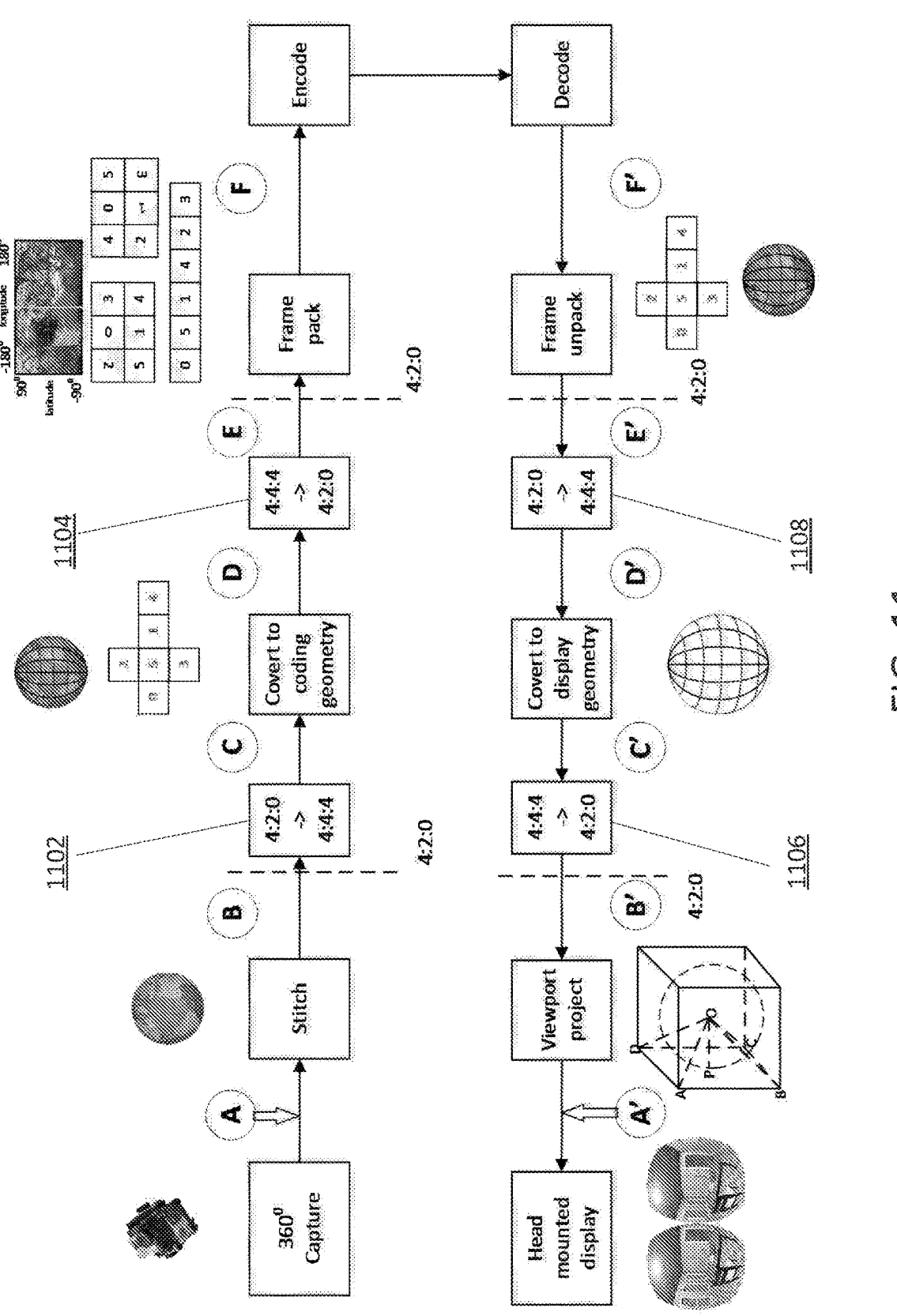
FIG. 11 depicts an exemplary workflow of 360-degree video processing.

The example workflow of 360-video processing as shown in FIG. 11 may be used for chroma phase preservation. A 360-degree video content in a first geometry may be received. The 360-degree video content may include unaligned chroma and luma components associated with a first chroma sampling scheme. For example as shown in FIG. 11, a 360-degree video may be captured using multiple cameras at point A. The captured videos may cover the spherical space. The videos may be stitched together to form a first geometry structure. The first geometry may be a stitched geometry. The stitched geometry may be in an equirectangular format. For example, the videos may be stitched to generate a video in an equirectangular geometry format. The stitched video may be associated with a first chroma sampling scheme. The first chroma sampling scheme may have unaligned chroma and luma components. The equirectangular geometry structure may be converted to another, a second geometry structure. The second geometry may be a coding geometry, for encoding (e.g., encoding with video codecs). The coding geometry may be in a cubemap format. For example, the equirectangular geometry structure may be converted to a cubemap geometry format for encoding (e.g., encoding with video codecs). The coded video may be delivered to the client via, for example dynamic streaming or broadcasting. The video may be decoded, for example at the receiver. The decompressed frame may be unpacked to a geometry such as a display geometry. The decompressed frame may be unpacked to an equirectangular geometry format. The geometry may be used for rendering. For example, the geometry may be used for rendering via viewport projection according to a user's viewing angle.

Geometry conversion processes may be applied to preserve chroma phase of the video. The video may be in a 4:2:0 chroma format. As shown in FIG. 11, geometry conversion processing, in both pre-processing before encoding and post-processing after decoding, may be performed to video in a 4:4:4 chroma format. Chroma upsampling may be applied to the video. For example, chroma upsampling may be applied to the video in a 4:2:0 chroma format to obtain the video in a 4:4:4 format at 1102. Geometry conversion may be applied to video. For example, geometry conversion may be applied to video in a 4:4:4 format, where there is no phase shift between chroma and luma components. Independent geometry conversion may be applied to luma and chroma components separately. After geometry conversion, a chroma subsampling filter may be applied to convert the video. For example, the chroma subsampling filter may be applied to convert the video in a 4:4:4 format back to the video in a 4:2:0 chroma format at 1104. The phase relationship between chroma and luma may be preserved.

A luma and chroma sampling grid for video in a 4:2:0 chroma format may be used as shown in FIG. 13. The chroma sampling grid may be marked as Dx, and the luma sampling grid may be marked as Ux. In the pre-processing part, the picture output from stitching processing, at point B in FIG. 11, may be associated with a first chroma sampling scheme. The first chroma sampling scheme may have unaligned chroma and luma components. The picture output from stitching processing may be converted to video in a 4:4:4 chroma format from the video in a 4:2:0 chroma format to align the unaligned chroma and luma components. Aligning the unaligned chroma and luma components may be done by applying a chroma upsampling filter at 1102. For example, the interpolation filter in HEVC motion compensation for chroma component at phases ¼ and ¾ may be used for chroma vertical upsampling, and the interpolation filter at phase ½ may be used for chroma horizontal upsampling. The filters may include 4-tap filters as listed below:

¼ phase: {−4, 54, 16, −2}
½ phase: {−4, 36, 36, −4}
¾ phase: {−2, 16, 54, −4}.

Aligning the unaligned chroma and luma components may involve applying a sampling grid associated with a second chroma sampling scheme. The second chroma sampling scheme may have aligned chroma and luma components. Aligned chroma and luma components in the second chroma sampling scheme may be that the chroma sample components may be overlaid with the luma components at the same sampling locations.

The converted picture in 4:4:4 chroma format may be used for geometry conversion. For example, geometry conversion may be applied to an equirectangular image format and may convert it to a cubemap image format. After the conversion, a chroma downsampling filter may be applied. For example, the chroma downsampling filter may convert the video in a 4:4:4 chroma format to the video in a 4:2:0 chroma format at 1104. The converted video format may be used in the original video format. The converted video format may be used for encoding. For example, a 3-tap filter {1, 6, 1} may be used for horizontal downsampling. A 2-tap filter (1, 1) may be used for vertical downsampling. Other upsampling and downsampling filters may be used to convert 4:2:0 chroma format to and from 4:4:4 chroma format.

After decoding, the decoded picture may be frame unpacked into a coding geometry structure. For example, the coding geometry structure may be a cubemap format. The frame unpacked picture at point E' in FIG. 11 may be converted from coding geometry to display geometry. An example of the coding geometry may be a cubemap format. An example of display geometry may be an equirectangular format. Luma upsampling may be performed. Luma upsampling may be performed prior to geometry conversion. Chroma upsampling may be performed. For example at 1108 in FIG. 11, chroma upsampling may be performed from video in a 4:2:0 chroma format to the video in a 4:4:4 chroma format. Chroma upsampling may be done before geometry conversion. Independent geometry conversion processes may be applied to luma and chroma separately. The relative phase relationship between the luma and chroma sampling may be preserved. Chroma downsampling may be applied depending on whether the viewport projection process supports 4:4:4 chroma format. Chroma downsampling may be applied after conversion. If viewport projection process does not support video in a 4:4:4 format, chroma downsampling filter may be applied at 1106. If viewport projection process does support video in a 4:4:4 format, the geometry converted picture in 4:4:4 chroma format may be passed for display.

For video in a 4:2:0 chroma format, there are four kinds of chroma sampling grid placement relative to luma grid for progressive video format. These are defined in HEVC and H.264/AVC as chroma sample location types. The chroma sample location type may be defined in Table 1.

TABLE 1

| Chroma Sample Location Type Definition | | |
| --- | --- | --- |
| Chroma sample location type | Vertical phase shift relative to luma sample location | Horizontal phase shift relative to luma sample location |
| 0 | 0.5 | 0 |
| 1 | 0.5 | 0.5 |

TABLE 1-continued

Chroma Sample Location Type Definition

| Chroma sample location type | Vertical phase shift relative to luma sample location | Horizontal phase shift relative to luma sample location |
|---|---|---|
| 2 | 0 | 0 |
| 3 | 0 | 0.5 |

Type 0 chroma sample location type may be used for video in a 4:2:0 chroma format. FIG. 13 illustrates an example type 0 chroma sample location type for video in a 4:2:0 chroma format. Type 0 chroma sample location type may have a misalignment of 0.5 samples in the vertical direction. As shown in FIG. 11, upsampling the video in a 4:2:0 chroma format to a 4:4:4 chroma format may reduce geometry conversion issues caused by non-zero relative phase between luma and chroma. A resampling filter may be used. For example, the resampling filter may be used in a direction that may align the chroma sample location with luma sample location. The resampling filter may be used before performing geometry conversion. An example of a resampling filter may be an upsampling filter. Aligning luma and chroma components may be performed separately. After geometry conversion, the corresponding resampling filter may be applied in the direction(s) to obtain the final chroma components. An example of the corresponding resampling filter may be a downsampling filter. Applying the resampling filter may be performed according to input chroma sample location type.

For example, if the input chroma sample location type is 0, vertical upsampling may be applied. The vertical upsampling may align chroma sample location with luma sample location. Luma and chroma sample locations may be aligned in the horizontal direction, and upsampling may be skipped. For example, horizontal upsampling may be skipped if the luma and chroma sample locations are aligned in horizontal direction. Vertical downsampling to chroma components may be applied. The vertical downsampling may derive the chroma sample values at the locations in chroma sample location type 0. The vertical downsampling to chroma component may be applied after the geometry conversion. This may be similar to (e.g., mathematically equivalent to) performing the geometry conversion process in 4:2:2 chroma format, where the chroma component has ½ resolution of a luma component in the horizontal direction and has same resolution as a luma component in the vertical direction. If the input chroma sample location type is 1, both vertical and horizontal upsampling may be applied to align the chroma sample location with the luma sample location, which may be the same as the conversion in 4:4:4 chroma format. Vertical and/or horizontal downsampling to chroma components may be applied to derive those chroma sample values at chroma locations in chroma sample location type 1. The vertical and/or horizontal downsampling to chroma components may be applied after conversion. If the input chroma sample location type is 2, resampling in neither the horizontal nor vertical direction may be used, as the relative phase shift between luma and chroma is equal to 0 in both direction. In this case, the geometry conversion may be applied in the 4:2:0 chroma format. If the input chroma sample location type is 3, horizontal upsampling may be applied to align chroma sample location with luma sample location. Horizontal downsampling to chroma components may be applied to derive those chroma sample values at chroma locations in chroma sample location type 3. Horizontal downsampling to chroma components may be applied after conversion. When chroma resampling is applied in a direction, such as vertical, horizontal, or both the 4-tap ¼ and ¾ phase chroma resampling filters may be applied.

If chroma sample location type is 2, geometry conversion may be performed in a 4:2:0 format. Having chroma sample location type 2 may represent a lower complexity as the resolution of the chroma components may be the lower. If input chroma format is 4:2:0 and chroma sample location type is not equal to 2, conversion of the input chroma sample location type to chroma sample location type 2 may be performed. The conversion may be performed by applying phase realignment filters to realign the chroma samples to the sampling grid used by chroma sample location type 2. Phase realignment filters may be applied while maintaining the same chroma component resolution. Geometry conversion for luma and chroma components may be applied separately. Corresponding inverse phase realignment filters may be applied to the chroma components. Corresponding inverse phase realignment filters may be applied after geometry conversion. Applying inverse phase realignment filters may align the chroma samples back to the original input chroma sample location type. The corresponding inverse phase realignment process after geometry conversion may be skipped, and the 360-degree video with chroma sample location type 2 may be coded. For example, the chroma sample location type 2 may be coded by changing the chroma sample location type to 2 and signaling the chroma sample location type in the bitstream.

The decoder may determine whether to convert the signal from chroma sample location type 2 to another chroma sample location type. The decoder may determine whether to convert the signal depending on the chroma sample location type that the decoder supports. For example, if the display does not support chroma sample location type 2, inverse phase realignment at the client side may be performed. Phase realignment filters may be used. For example, the resampling filters listed in Table 2 and Table 3 may be used. The phase realignment filters may be based on the input chroma sample location type. Table 2 lists example phase realignment filters that may be used to convert an input chroma sample location type to type 2. Table 3 lists example inverse phase realignment filters that may be used to convert chroma sample location type 2 to another chroma sample location type. 4-tap filters may be used with these phase realignment filter examples. Longer or shorter tap filters may be used. For example, different tap filters may be used as long as they have the same phase relationship as those shown in Table 2 and Table 3.

TABLE 2

Resampling Filter Examples that may be used for Chroma Sample Location Type Conversion From Other Types to Type 2

| Input chroma sample location type | Vertical resampling filter | Horizontal resampling filter |
|---|---|---|
| 0 | ¾ phase: {−2, 16, 54, −4} | None |
| 1 | ¾ phase: {−2, 16, 54, −4} | ¾ phase: {−2, 16, 54, −4} |
| 2 | None | None |
| 3 | None | ¾ phase: {−2, 16, 54, −4} |

TABLE 3

Resampling Filter Examples that may be used for Chroma Sample
Location Type Conversion From Type 2 to Other Types

| Output chroma sample location type | Vertical resampling filter | Horizontal resampling filter |
|---|---|---|
| 0 | ¼ phase: {−4, 54, 16, −2} | None |
| 1 | ¼ phase: {−4, 54, 16, −2} | ¼ phase: {−4, 54, 16, −2} |
| 2 | None | None |
| 3 | None | ¼ phase: {−4, 54, 16, −2} |

Figure 12:
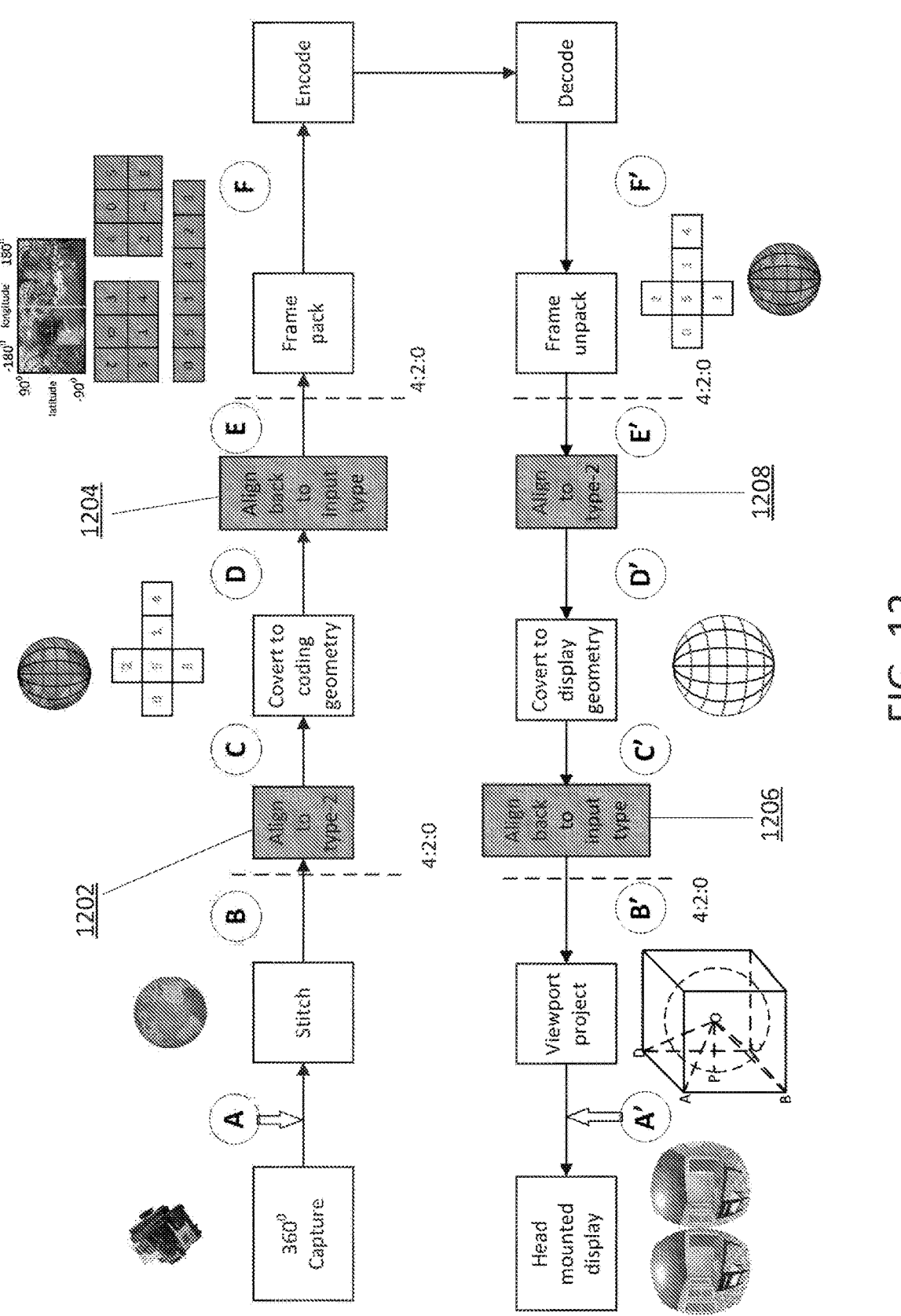
FIG. 12 depicts an exemplary workflow of 360-degree video processing.

FIG. 12 shows an example workflow of 360-degree video processing. The chroma sample location type aligned boxes may be shown in FIG. 12 at 1202, 1204, 1206, and 1208. Some or all of the chroma sample location type alignment, such as at 1204, 1206, and/or 1208, may be skipped. For example, if the 360-degree video in chroma sample location type 2 may be coded and/or displayed at Point A', some or all of the chroma sample location type alignment process may be skipped.

An indication may be produced in a bitstream. The indication may be produced from an encoder, for example at point E. The indication may indicate whether the chroma components, which may be chroma samples, have been aligned back to the chroma component of the input type before encoding the 360-degree video. For example in the encoder, a 360-degree video content may be received in a first geometry. The video content in the first geometry may be associated with a first chroma sampling scheme having unaligned chroma and luma components. The video content may align the unaligned chroma and luma components to a sampling grid associated with a second chroma sampling scheme having aligned chroma and luma components. The 360-degree video content, which is in the first geometry, may be converted to a second geometry. The second geometry may have the chroma and luma components aligned to the sampling grid associated with the second chroma sampling scheme. An indication may be produced if the 360-degree video content, which is in the second geometry having aligned chroma and luma components, is aligned back to the video content with the input type. The video content with the input type may have unaligned chroma and luma components.

A decoder may receive the indication from the encoder. If a decoder receives such indication, the decoder may determine whether to apply a filter to align the chroma components based on the display capacity. The display capacity may be associated with a viewport projection and/or a display device, such as HMD at point B' and/or A'. The decoder may apply the filter to align the chroma components. For example, the decoder may align the video to chroma sample location type 2. The decoder may perform alignment before converting the video into a display geometry.

If the decoder determines that it may support the display capacity for a 360-degree video in chroma sample location type 2, the chroma components may not align back to the input type. For example, the decoder may skip the realignment process back to input type at 1206. If the decoder determines that it does not support the display capacity for the 360-degree video in chroma sample location type 2, the chroma components in the 360-degree video may be aligned back to input type. For example, an inverse realignment filter may be used to restore the aligned chroma component of the 360-degree video having the second chroma sample scheme back to having unaligned chroma components associated with the first chroma sampling scheme. The realigned video may go through viewport projection and/or the display.

Figure 10:
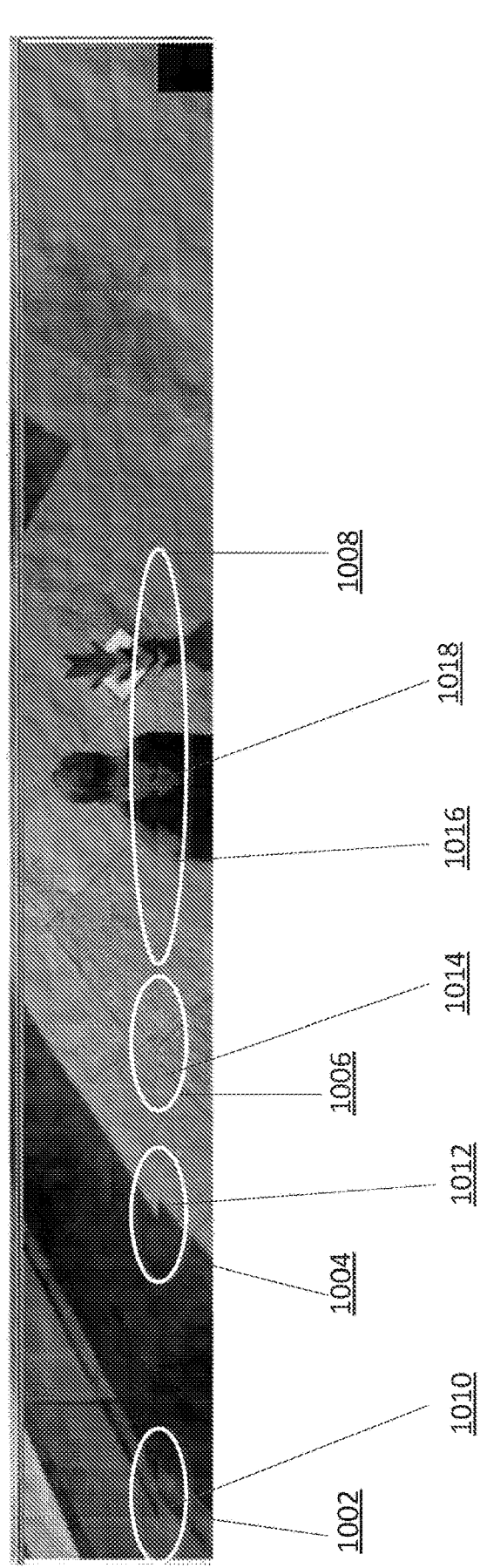
FIG. 10 illustrates an example magnified view of a portion of FIG. 8 (e.g., 803).

Sampling grid for geometry conversion may address boundary misalignment and/or visual artifacts (e.g., as shown in FIGS. 8-10) for the converted cubemap with the conversion tools. Boundary misalignment and/or visual artifacts may negatively affect the compression performance because of discontinuity and may degrade the final display quality. If misaligned cubemap is converted back to equirectangular for display, the quality may be distorted because the error may spread out during inverse conversion. Sampling of equirectangular projection may use the equirectangular picture obtained from stitching and may have a width to height ratio of 2:1. The samples in the picture may be evenly sampled in the longitude and latitude directions. If an equirectangular picture is directly sampled, the horizontal and/or vertical directions may not be the same in terms of circular characteristics. In the horizontal direction, the longitude may range from −180-degree to 180-degree, and the two boundaries may be seamlessly connected. For example, the horizontal boundaries at the −180-degree longitude may have the same as the boundaries at the 180-degree longitude. In the vertical direction, the latitude may range from 90-degree to −90-degree, and the 90-degree latitude and −90-degree latitude may not be connected. The 90-degree latitude and −90-degree latitude may be far apart on the sphere. For example, the 90-degree latitude and −90-degree latitude may be the farthest apart on the sphere. The 90-degree latitude may represent the North pole and the −90-degree latitude may represent the South pole on the sphere.

Figure 14:
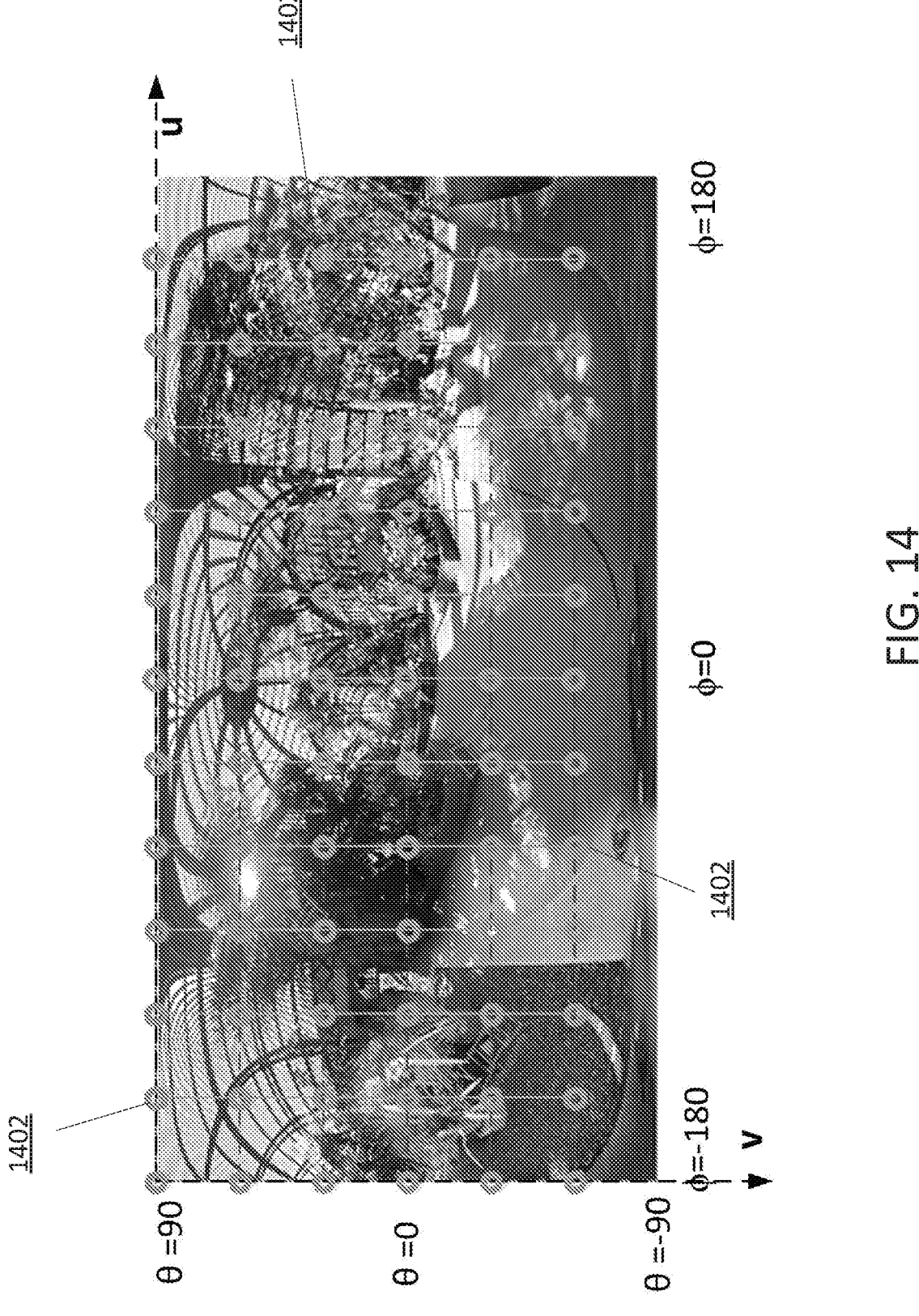
FIG. 14 shows an example sample grid using a 12×6 resolution.
Figure 15:
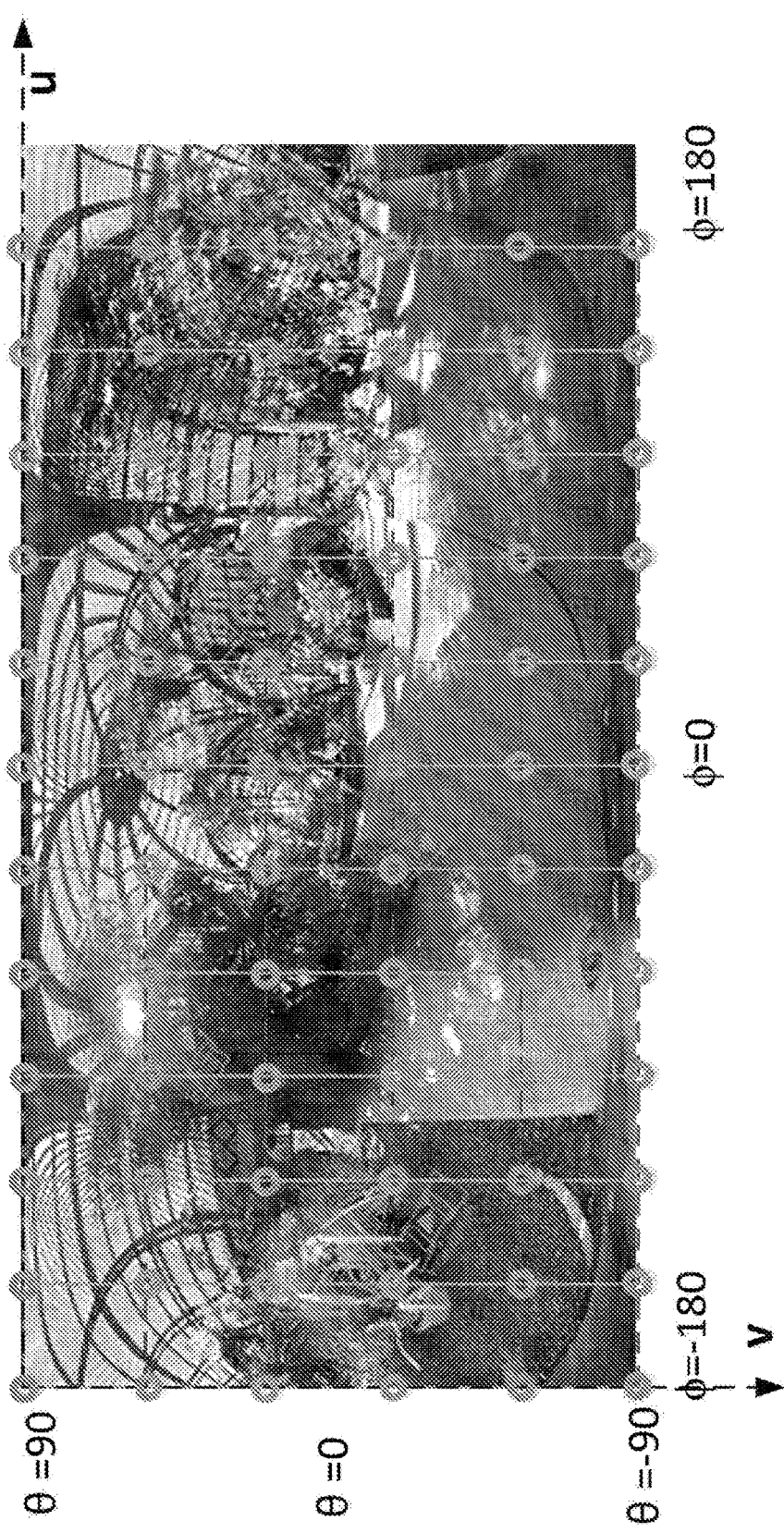
FIG. 15 shows an example sample grid using a 12×6 resolution.
Figure 16:
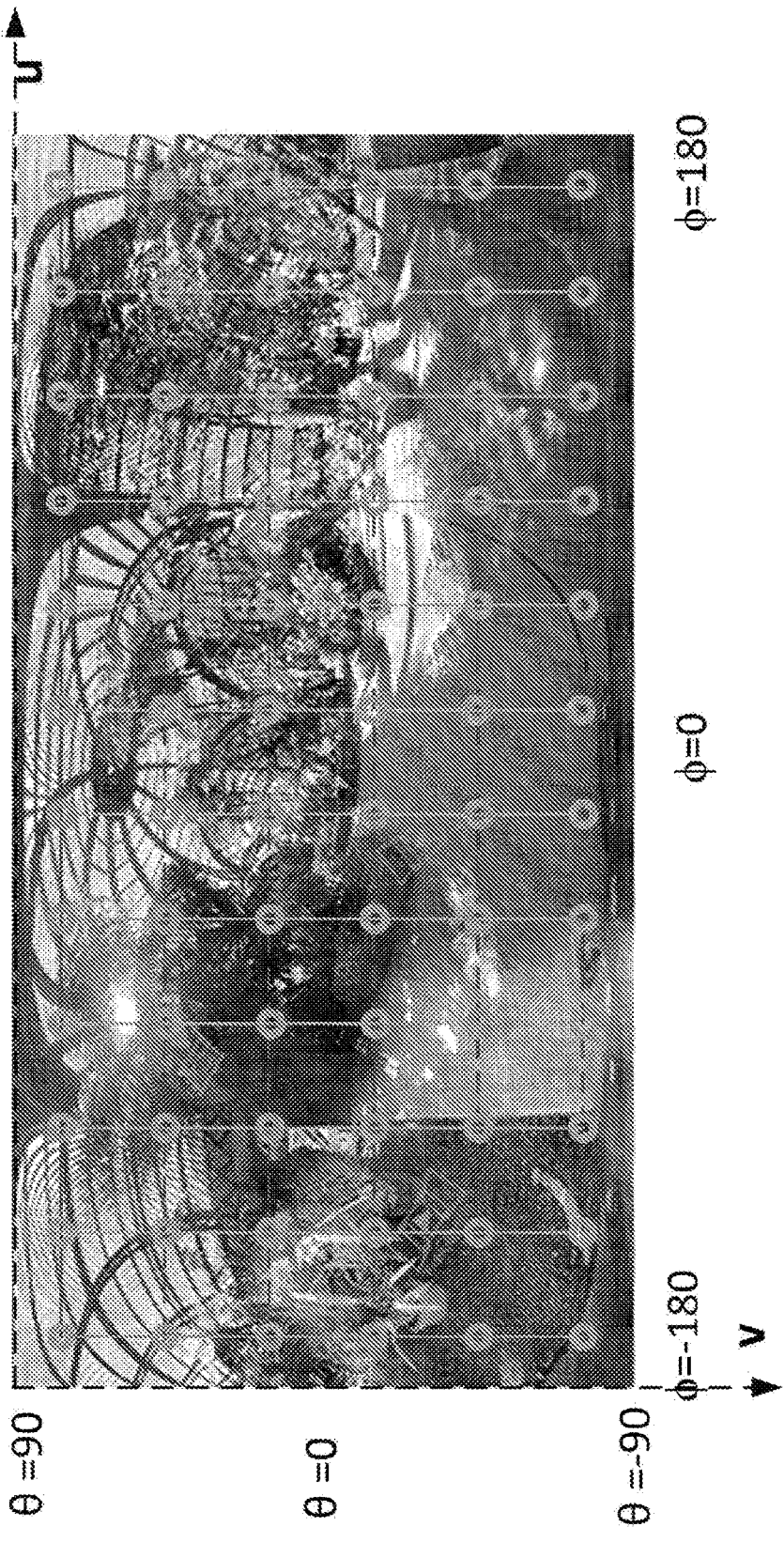
FIG. 16 shows an example sample grid using a 12×6 resolution.
Figure 17:
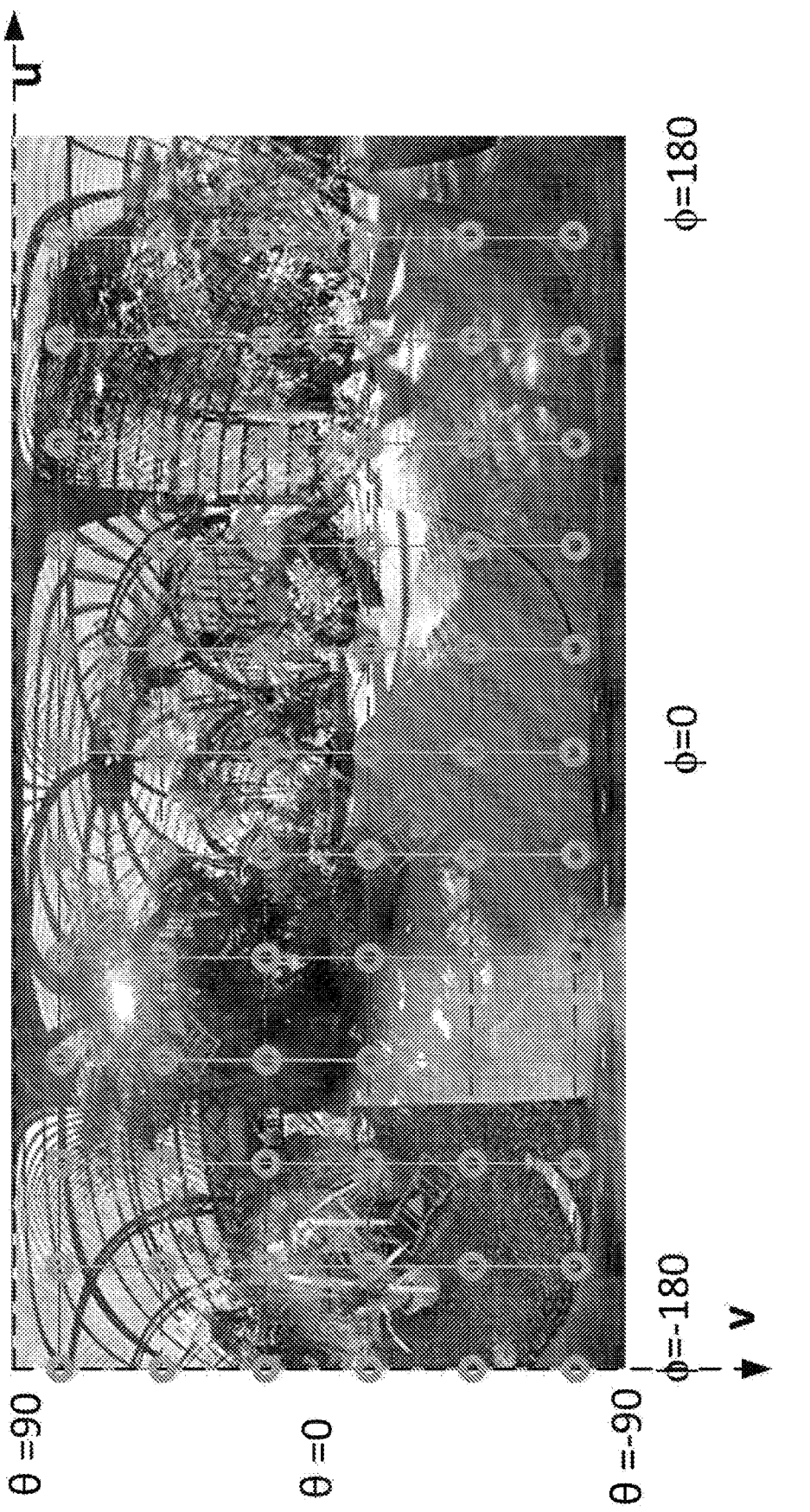
FIG. 17 shows an example sample grid using a 12×6 resolution.

An equirectangular picture may be sampled. For example, the equirectangular picture may be sampled using a resolution 12×6, as shown in FIG. 14. FIG. 14 illustrates an example grid placement for even sampling in both horizontal and vertical directions with a square sampling grid. The square sampling grid shown in FIG. 14 may be used by the geometry conversion tool. The circles at 1402 may represent the sampling locations. The horizontal sampling may be within the whole longitude range [−180, 180]. The vertical sampling within latitude range (−90, 90] may not cover the South Pole. The South Pole may be located at the bottom of the equirectangular picture. This situation may be considered in geometry conversion. When points (ue, ve) have fractional precision, interpolation processes may be applied to obtain the sample value at the fractional position. One extended line corresponding to the South Pole may be filled by interpolation. For example, the extended line may be interpolated using the average value of its nearest neighboring horizontal line. FIG. 15 shows an example of sampling grid arrangement to cover the whole range within both longitude and latitude directions. The sample's shape in FIG. 15 may be non-square. For example, the sample may have a rectangular shape. The non-square sample shape may be biased against the vertical direction by effectively sampling the vertical direction more sparsely than the horizontal direction. Stitching may not support this format with a non-square sample shape. FIGS. 16 and 17 show sampling placement examples that cover within the whole range in a symmetric way. The vertical shift sample may make the symmetric sampling in the vertical direction while covering the whole range with a square grid. For example, the vertical shift sample of 0.5 may make the symmetric sampling in the vertical direction while covering the whole range with a square grid. FIGS. 16 and 17 show a horizontal shift of 0.5 and 0 respectively as exemplary manners. Horizontal shift less than 1 may be used because the horizontal direction is circularly symmetric.

Figure 18:
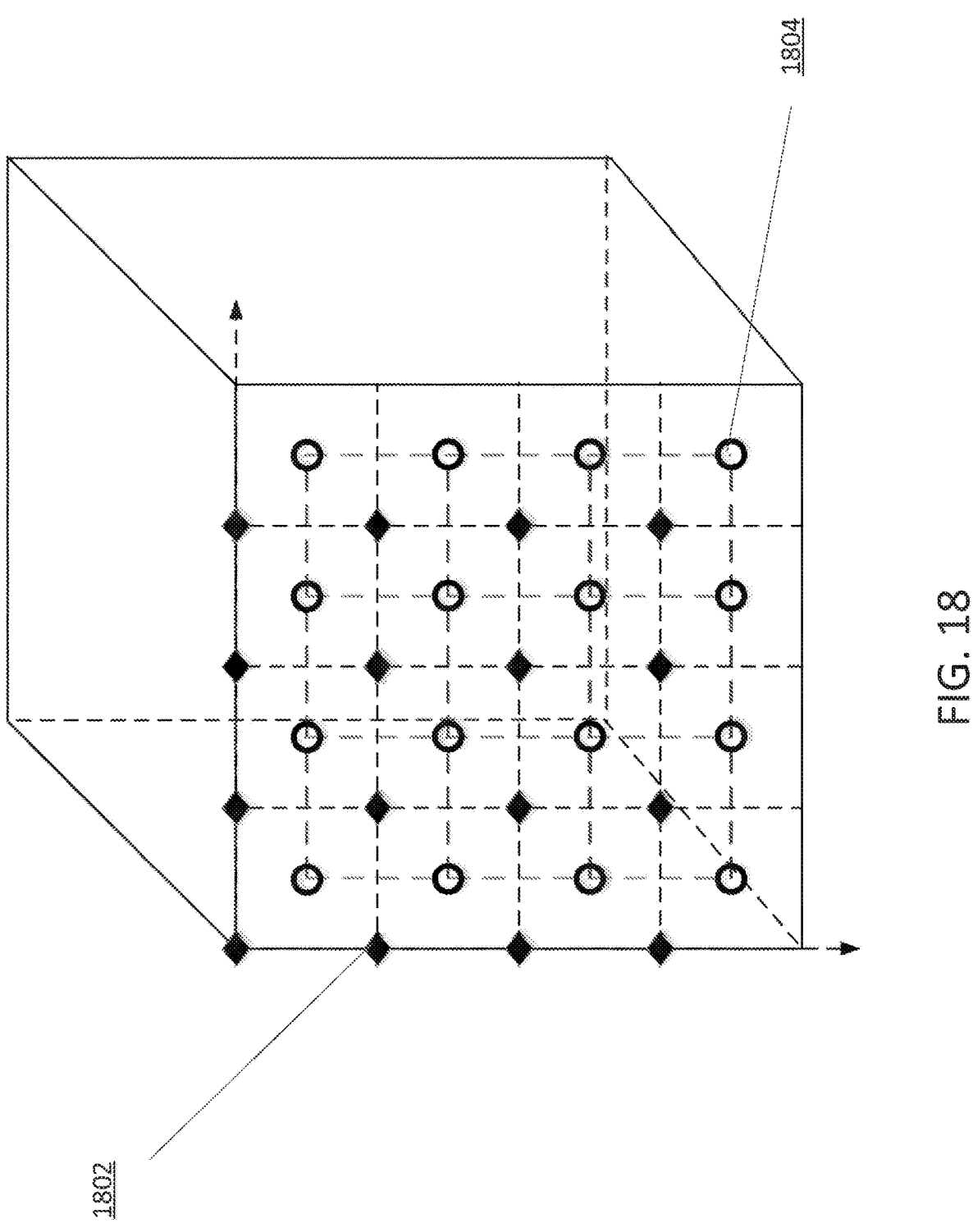
FIG. 18 shows two example sampling grid arrangements for cubemap.

FIG. 18 shows two example sampling grid arrangements for cubemap. On a face, the top boundary and the bottom boundary may not be immediately connected, and the left boundary and the right boundary may not be immediately connected. Each face of the cubemap may not be circularly symmetric. A sampling resolution of 4×4 for each face may be used, as shown in FIG. 18. In FIG. 18, the diamond grid 1802 may show the sampling grid placement with zero phase shift, which may be used by a geometry conversion tool. Using the diamond sampling grid for some or all faces of the cubemap may be difficult and may be complicated to cover some or all the boundaries between two neighboring faces. The circle grid 1804 in FIG. 18 may be used to cover some or all the faces in a symmetrical manner. For example, the circle grid may cover the samples in cubemap evenly. The sampling grid may be the same for some or all faces.

Padding may be used for 360-degree video processing. Conversion processes may use chroma upsampling and/or chroma downsampling to support chroma format conversion. For example, chroma upsampling may be applied to convert the video in a 4:2:0 format to a 4:4:4 format, or chroma downsampling vice versa. Resampling filters may be used. Geometry conversion may be applied. For example, geometry conversion may be applied to convert an equirect-angular image format to a cubemap image format. In geom-etry conversion, if the projected point on an equirectangular is not an integer position, an interpolation filter may be applied. The interpolation filter may derive the sample value at a fractional position. Filters may be applied to samples. The filters may be applied to luma and/or chroma compo-nents. The luma and chroma samples may be located close to the picture boundary. Samples outside the picture bound-ary may be referred to as a padding chroma sample or a padding luma sample. For interpolating the sample value at an integer position, padding (e.g., geometry padding) may be used to derive the sample values outside the picture boundary or located in a different face as the current block. Padding may be used for different geometries.

Figure 19:
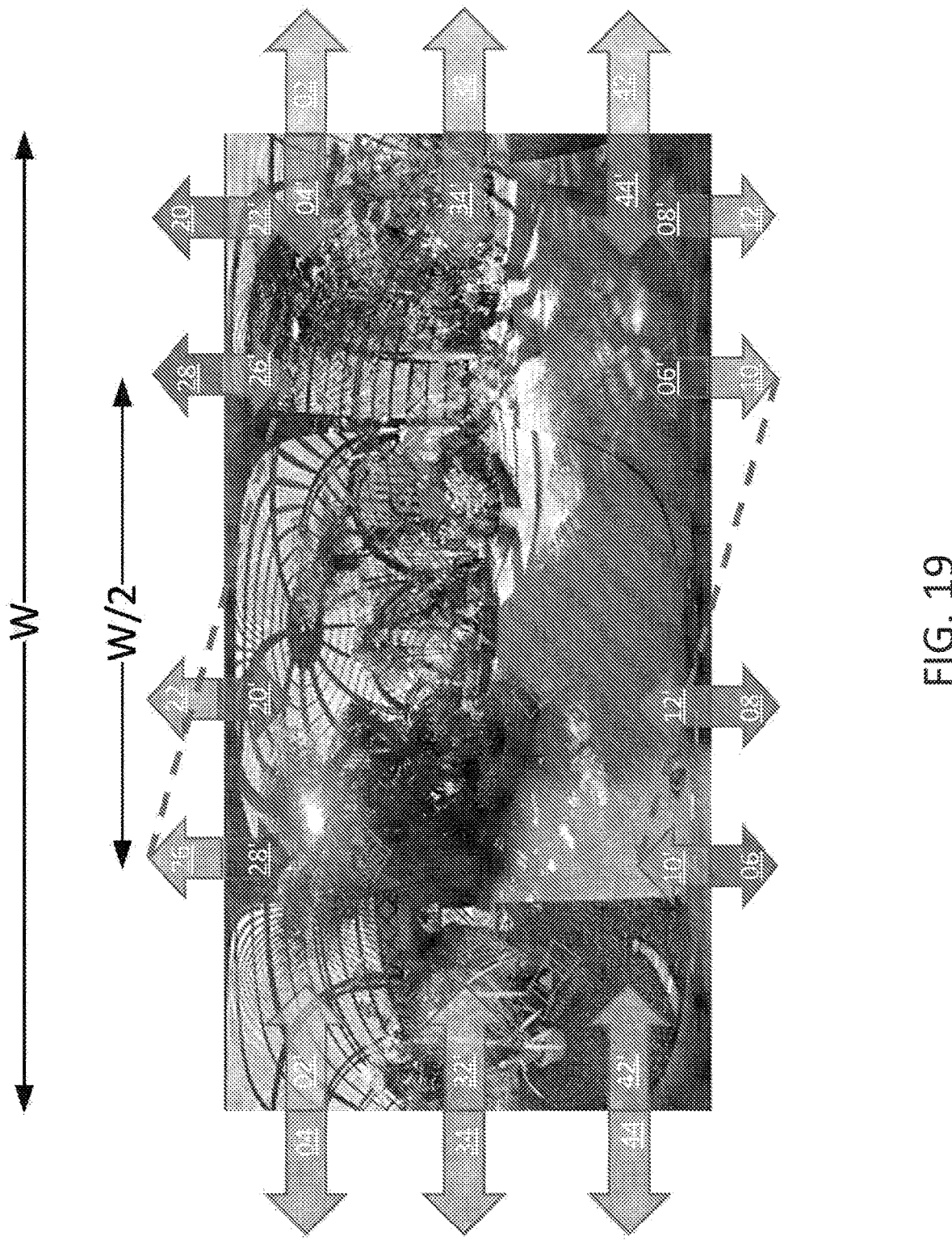
FIG. 19 shows an example of geometry padding for an equirectangular picture.

FIG. 19 shows example padding for an equirectangular picture. If a point is beyond a right boundary at 02, padding may be performed by rewinding back to the left boundary at 02' due to the circular characteristics. For example, the location of the point outside of the boundary may be referred to as a neighboring sample location. For example, the point outside of the boundary may be referred to padding chroma sample or padding luma sample. For example, the point outside of the boundary may be referred to padding chroma component or padding luma component. The right boundary and left boundary may be spherically continuous. If the point is beyond a bottom boundary at 06, 08, 10, or 12, padding may follow the longitude line and go to another hemisphere at 06', 08', 10', or 12' respectively. For example, the points located at the bottom boundary that may be displaced in 180-degree of the initial bottom boundary. If the point is beyond a top boundary at 20, 22, 26, or 28, padding may follow the longitude line and go to another hemisphere at 20', 22', 26', or 28' respectively. For example, the points located at the top boundary that may be displaced in 180-degree of the initial top boundary. The arrows with the same reference numerals such as 02 and 02', 32 and 32', 42 and 42', 04 and 04', 34 and 34', and 44 and 44', 06 and 06', 08 and 08', 10 and 10', 12 and 12', 20 and 20', 22 and 22', 26 and 26', and/or 28 and 28' in FIG. 19 may indicate the continuity on the sphere. As described herein, the top boundary may represent the North pole of the sphere, and the bottom boundary may represent the South pole of the sphere. The symmetric sampling grid arrangement may be applied. For example, sampling grid arrangement with a phase shift of 0.5 shown in FIG. 16 may be applied. A point (u, v) may be provided based on a current location in a picture. For example, the point (u, v) may be outside the equirectangular picture. The position of point (u, v) may be referred to as a neighboring sample location, and may be used to derive the padding sample location (up, vp). The point (up, vp) may be referred to as a padding sample, or a reference sample. The point position (up, vp) for equirect-angular may be calculated as follows:

$$\text{if } u<0 \text{ or } u \geq W \text{ and } 0 \leq v<H, up=u\% \ W, vp=v \quad (15)$$

$$\text{if } v<0, vp=-v-1, up=(u+W/2)\% \ W \quad (16)$$

$$\text{if } v \geq H, vp=2*H-1-v, up=(u+W/2)\% \ W. \quad (17)$$

where W and H may indicate the width and height of the equirectangular picture. For example, the padding sample location (up, vp) may be calculated based on the location of the point (u, v). For example, if the point (u, v) is beyond the right or left boundary, the padding sample (up, vp) may be calculated based on Equation 15. The padding sample (up, vp) of the point (u, v), that is beyond the right or left boundary, may correspond to the point located near the left or right boundary of the equirectangular picture, respec-tively. Other padding samples may be calculated based on the position of the point (u, v) that may correspond to Equation 16 or 17.

Figure 20:
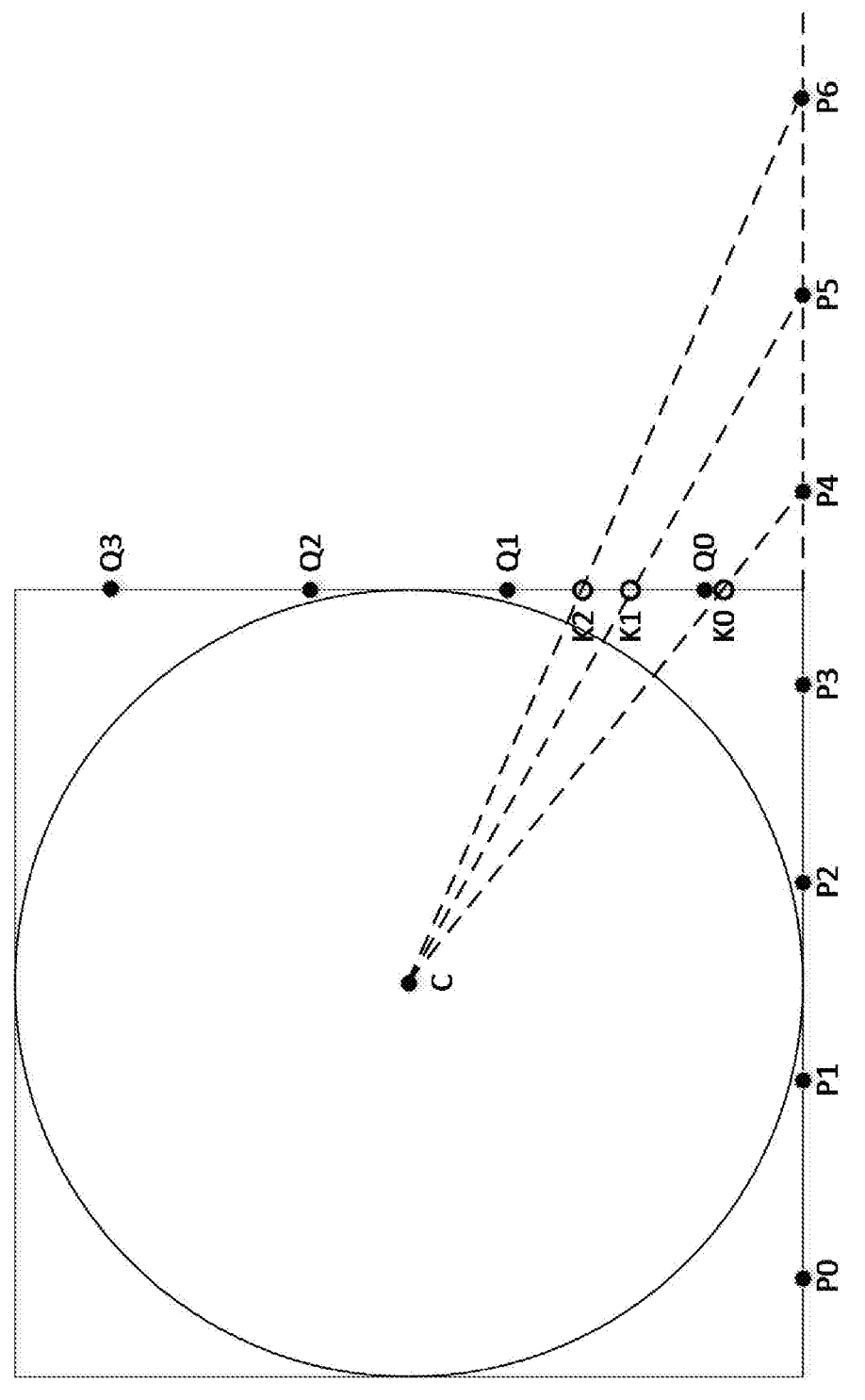
FIG. 20 shows an example of geometry padding for the face picture of a cubemap.

For the padding shown in FIG. 20, the circle may be the equator of the sphere, and the four sides of the square may be four lines on the 4 side faces of the cubemap to which the equator projects. P may represent a face of the cubemap, and Q may represent an adjacent face of face P. Px (x∈[0,3]) may be the sampling points on face P, and Qx (x∈[0,3]) may be the sampling points on neighboring face Q. For example, if neighboring samples P4, P5 and P6 are samples outside of the face boundaries and if P4, P5 and P6 are to be padded on face P, padding samples K0, K1 and K2 may respectively represent the projection of P4, P5 and P6 on the face Q. The point location of P4, P5 and P6 may be referred to as neighboring sample locations. The padding samples may include padding chroma samples and/or padding luma samples. As shown in FIG. 20, K0 and Q0 may not overlap. K1 and Q1 and K2 and Q2 may not overlap. Padding samples K0, K1 and K2 may be used to fill the samples at P4, P5 and P6. K0, K1 and K2 may be referred to as a reference samples located at their respective reference sample locations.

Padding may be applied to the point p(u, v). The point p(u, v) may be located in a video content in a geometry structure. The point p(u, v) may be a neighboring sample of a current sample. The padding sample may include a chroma sample and/or a padding luma sample. One or more of the following may be used to derive a chroma sample value or luma sample value to align unaligned chroma and/or luma com-ponents.

The point p(u, v) may be identified based on a current sample at a current sample location. A current sample may include a current chroma sample and/or a current luma sample. A current sample location may include a current chroma sample location and/or a current luma sample loca-tion. For example, the current chroma sample at the current chroma sample location may be in a current face location. The current chroma sample may be associated with the padding chroma sample. The point p(u, v) may be located outside of the current face boundary. The point p(u, v) may be located in different face. The point p's 3D position Pf(X, Y, Z) may be calculated depending on the face to which the point p(u, v) belongs. For example, if the point p's face is NZ, equation (6), (7) and (8) may be used to calculate the 3D position (X, Y, Z). A new face may be determined based on the calculated 3D position (X, Y, Z). The sample may be used for padding, using (X, Y, Z) in the following way:

If ($|X| \geq |Y|$ and $|X| \geq |Z|$ and X>0), the face may be PX;
If ($|X| \geq |Y|$ and $|X| \geq |Z|$ and X<0), the face may be NX;
If ($|Y| \geq |X|$ and $|Y| \geq |Z|$ and Y>0), the face may be PY;
If ($|Y| \geq |X|$ and $|Y| \geq |Z|$ and Y<0), the face may be NY;
If ($|Z| \geq |X|$ and $|Z| \geq |Y|$ and Z>0), the face may be PZ;
If ($|Z| \geq |X|$ and $|Z| \geq |Y|$ and Z<0), the face may be NZ.

The point p's 2D position (u', v') may be calculated using Ps(X', Y', Z'). For example, the point p's 2D position (u', v') may be calculated based on the location of the new face. If the new face is located at NZ, equations (9) and (10) may be used to calculate padding sample location (u', v') with (X', Y'). The padding sample value at (u', v') may be derived to align unaligned chroma and/or luma components. The padding sample value at (u', v') may be derived using the interpolation filter and the picture of the new face that (u', v') belongs to.

Padding for a point (u, v) in a geometry structure may include any of the following. One or more of the following may be used to derive a padding chroma sample value or a padding luma sample value to align unaligned chroma and/or luma components. A current chroma sample at a current chroma sample location that is associated with the padding chroma sample may be determined. The chroma sample to be padded may be located outside of the picture boundary or face. The 3D position of the point Pf(X, Y, Z) may be calculated based on the point (u, v). Point (u, v) may represent the point located outside of the picture boundary or face. The padding sample location may be determined based on the location of the sample to be padded. For example, a 2D planar position (u', v') may be identified by applying a geometry projection of the 3D position of the padding chroma sample to a geometry structure. The padding sample value at the padding sample location, the 2D planar position (u', v'), may be derived to align unaligned chroma and/or luma components. The sample value at the 2D planar position (u', v') may be determined using interpolation filter and the planar picture.

Geometry padding as described herein, may be used in video encoding and/or decoding for various purposes. For example, padding may be used for motion compensation, intra prediction, loop filtering, Sample Adaptive Offset (SAO), and/or Adaptive Loop Filtering (ALF). For example, when encoding or decoding an equirectangular representation, padding for the equirectangular image may be applied. For example, reference sample locations may be derived similar to the derivation of padding sample locations as described herein. Padding for the equirectangular image may be applied for encoding and/or decoding padding at the edges of the 2D equirectangular image. For example, when encoding or decoding a cubemap representation, padding for the cubemap may be applied. Encoding and/or decoding padding for the cubemap may be applied at the cubemap face boundaries within the 2D cubemap image.

Figure 26:
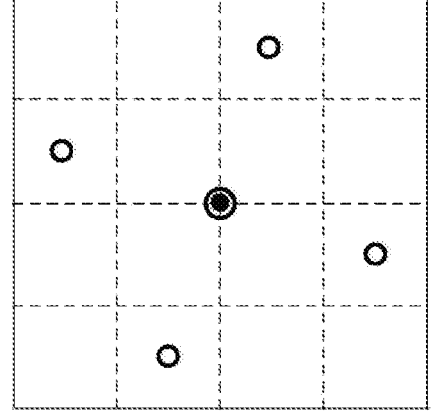
FIG. 26 shows an RGSS with center neighbor sample pattern.
Figure 28:
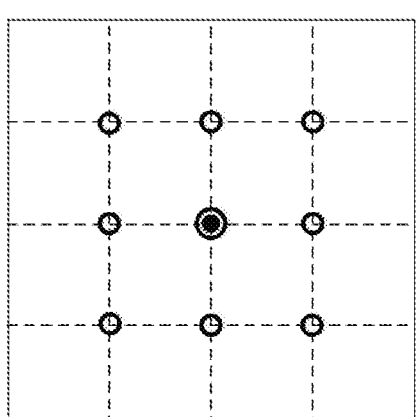
FIG. 28 shows a square 3×3 neighbor sample pattern with a center.
Figure 25:
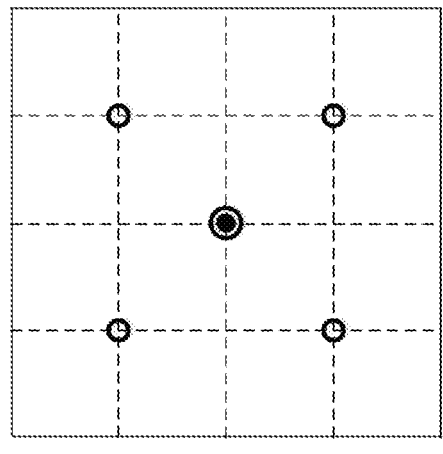
FIG. 25 shows a square 2×2 with a center neighbor sample pattern.
Figure 27:
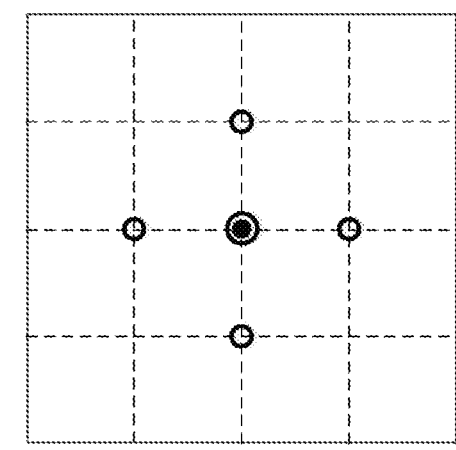
FIG. 27 shows a diamond with a center neighbor sample pattern.
Figure 29:
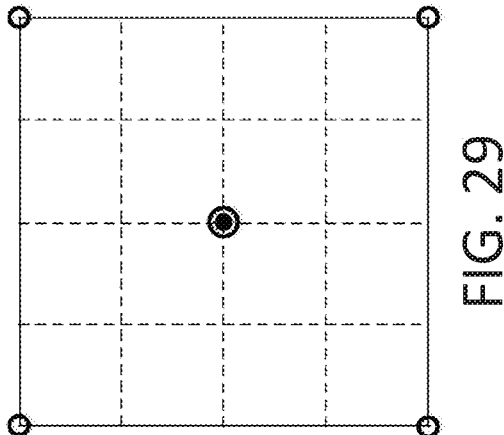
FIG. 29 shows a quincunx neighbor sample pattern.

Neighboring sample patterns may be used for the interpolation process. The interpolation process may be during geometry conversion. For a sample in a target geometry, multiple neighboring samples may be determined. The target sample values may be determined from those multiple neighboring samples. For example, the target sample values may be determined by weighted averaging of the multiple neighboring samples. FIGS. 21-29 show example neighboring sample patterns. FIGS. 21-29 show example sampling patterns for geometric conversions. Each of FIGS. 21-29 shows an example square 1×1 grid. FIG. 21 shows an example square 2×2 pattern. FIG. 22 shows an example rotated grid super sampling (RGSS) pattern. FIG. 23 shows an example diamond pattern. FIG. 24 shows an example square 3×3 pattern. FIG. 25 shows an example square 2×2 with a center pattern. FIG. 26 shows an example RGSS with center pattern. FIG. 27 shows an example diamond with a center pattern. FIG. 28 shows an example square 3×3 pattern with a center. FIG. 29 shows an example quincunx pattern. The center of the square, shown as a solid filled circle, may be the target sample position. The unfilled circles may be sampling positions used to derive the target sample. Weight may be applied to each sampling position. For example, equal weight for the sampling positions patterns in FIGS. 21-24 may be applied. ¼ weight for the weight of the center sampling positions and a 3/16 weight for the remaining positions may be applied in FIGS. 25-27 and 29. ⅛ weight for the center position and 7/64 weight for the weight of the remaining positions may be applied in FIG. 28. Different neighboring sample patterns may have various characteristics. A complex neighboring sample pattern may obtain a target sample that is less subjective to noise and less aliasing. RGSS pattern shown in FIGS. 22 and 26 may be used for anti-aliasing sampling. The target sample with neighboring sample pattern shown in FIGS. 25-29 may be sharper than that in FIGS. 21-24.

Performance and/or computation complexity may be affected by the neighboring sample pattern and the interpolation filter selected for the geometry conversion process. A neighboring sample pattern may be selected and/or combined based on an interpolation filter. A neighboring sample pattern may be combined with an interpolation filter to achieve desired quality. For example, the neighboring sample pattern shown in FIG. 22 may be combined with an interpolation filter at a nearest neighbor to achieve certain quality. An interpolation filter may be selected based on the selected sample pattern. A simpler neighboring sample pattern may be combined with a more complex interpolation filter to achieve a desired quality. For example, a bi-linear or bi-cubic interpolation filter may represent more complex interpolation filter.

As shown in FIG. 11, a geometry conversion of a video with a 4:4:4 format may be used. The geometry conversion of the video with a 4:4:4 format may be complex. For example, the geometry conversion of the video with a 4:4:4 format may be complex due to the higher resolution of the chroma components. The complexity of the geometry conversion of the video with a 4:4:4 format's computation may be reduced at different levels. For example, the complexity of the geometry conversion may be reduced at the sample level. For example, the complexity of the geometry conversion may be reduced at the picture level.

At the sample level, the samples of three color components may be stored. For example, the components may be stored in an interleaved manner in an internal memory. The color components may be stored as $Y_0, Y_1, Y_2, \ldots, Y_{N-1}, Cb_0, Cb_1, Cb_2, \ldots, Cb_{N-1}$, and $Cr_0, Cr_1, Cr_2, \ldots, Cr_{N-1}$ where N=W×H. The sample data may be stored in an interleaved manner such as $Y_0, Cb_0, Cr_0, Y_1, Cb_1, Cr_1, Y_2, Cb_2, Cr_2, \ldots, Y_{N-1}, Cb_{N-1}, Cr_{N-1}$.

The geometry conversion process may be performed on a per-sample basis. The memory access using the interleaved arrangement to fetch three color components may be faster than when they are stored per component separately. Interpolation positions may be obtained. Single instruction multiple data (SIMD) may be applied for three component interpolation at the same time using the obtained interpolation positions.

Figure 30:
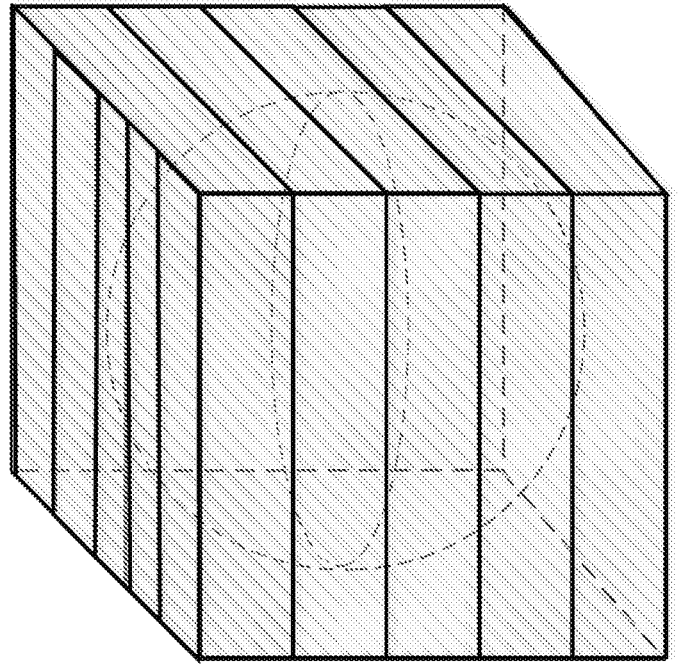
FIG. 30 shows geometry conversion using portioning of each face into multiple slices.

Geometry conversion may include obtaining the corresponding sample position in the source geometry. Geometry conversion may include applying interpolation. The interpolation may use neighboring samples if the source sample position has fractional precision. The corresponding source sample positions for obtaining the corresponding sampling position may remain the same for some or all the pictures in the video sequence. The source sample position may remain the same if performing geometry conversion for a video sequence includes a plurality of pictures. For a target position, the positions on the source geometry and the weights associated with those positions may be precalculated. The positions may be stored and may be used by some or all subsequent pictures. Interpolation may process each picture. The interpolation may be used for each target position. Interpolation may be used for each target position by using the pre-stored source geometry sample positions. The interpolation process may be sped up. For example, the interpolation process may be sped up using parallel processing techniques, such as multi-threading. As shown in FIG. 30, each face of cubemap may be partitioned into multiple slices. For example, each face of the cubemap may be partitioned into 5 slices. Some or all 30 (5×6) slices for the 6 faces may be interpolated. Some or all 30 slices of the 6 faces may be parallelly interpolated.

Figure 31:
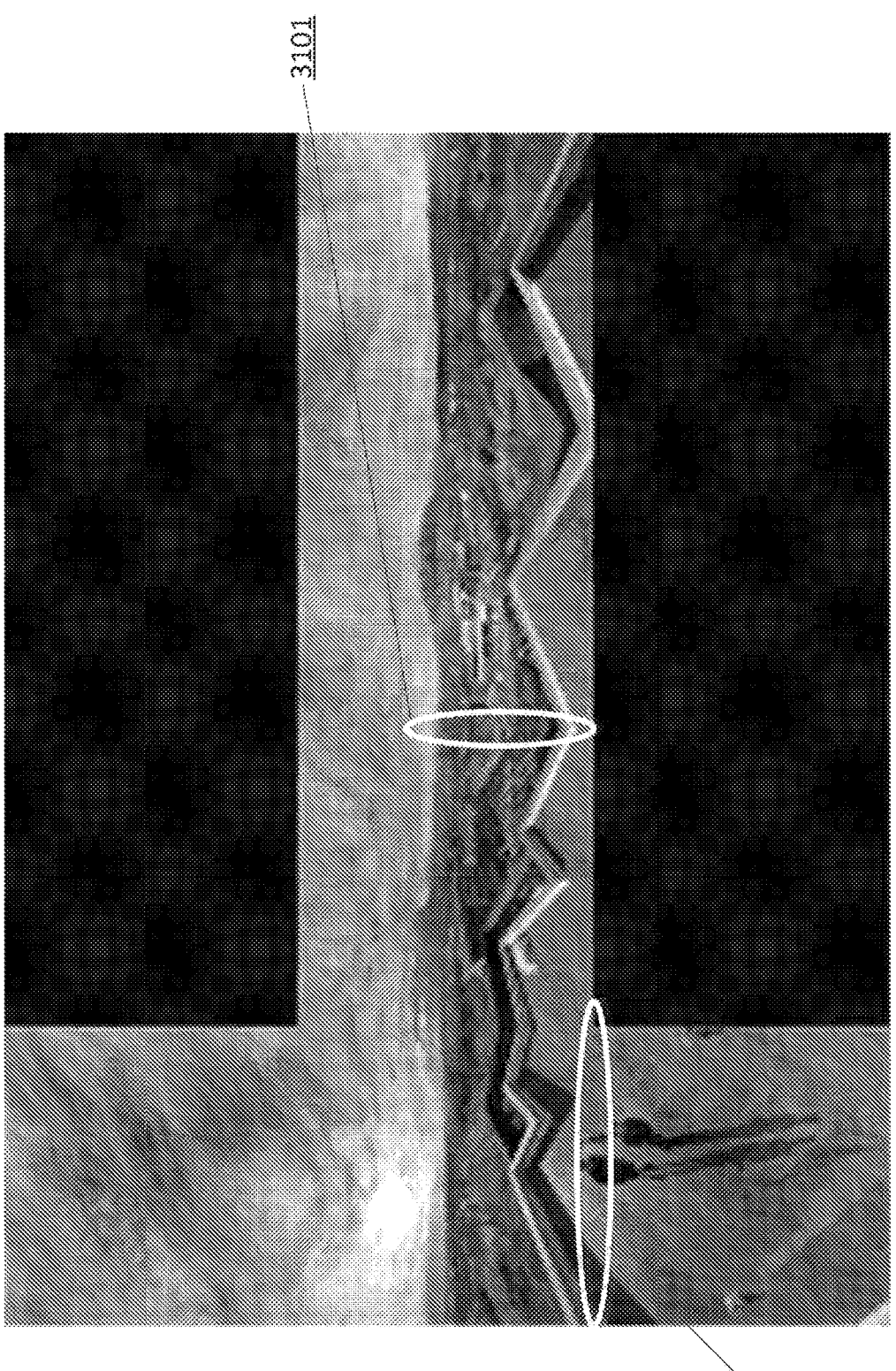
FIG. 31 shows a cubemap picture converted from the equirectangular picture of FIG. 3 using a geometry conversion workflow.
Figure 32:
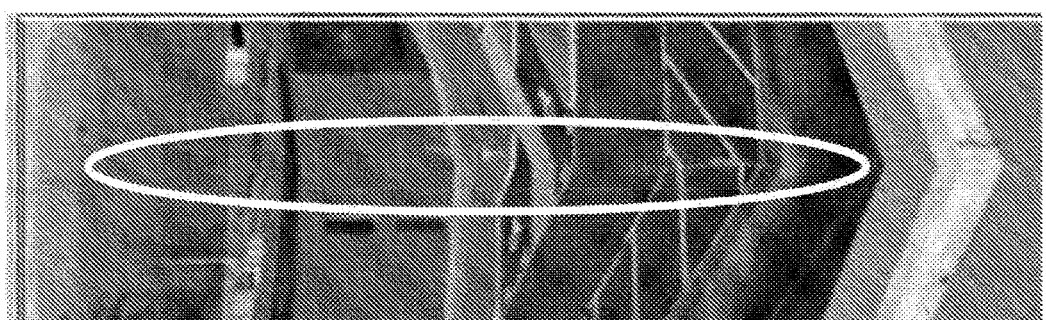
FIG. 32 is a magnified view of a portion of FIG. 31 (e.g., 3101).
Figure 33:
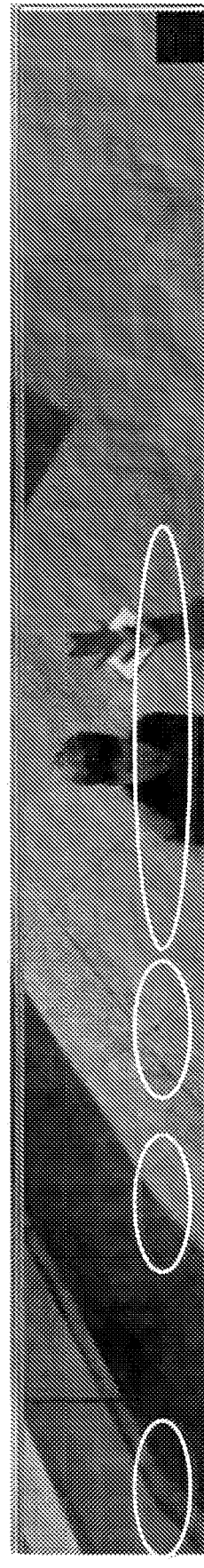
FIG. 33 is a magnified view of a portion of FIG. 31 (e.g., 3103).

FIG. 31 shows an example cubemap picture converted from the equirectangular picture of FIG. 3 using a geometry conversion workflow. FIGS. 32 and 33 show example zoomed vertical face boundary at 3101 and example zoomed horizontal face boundary at 3103 shown in FIG. 31, respectively. The boundaries shown in FIG. 31-33 are aligned (e.g., accurately). The cubemap representation where the face boundaries are aligned may be compressed efficiently as the signal may be continuous. Quality issues may be reduced when the cubemap representation is converted back to the equirectangular representation.

Figure 34A:
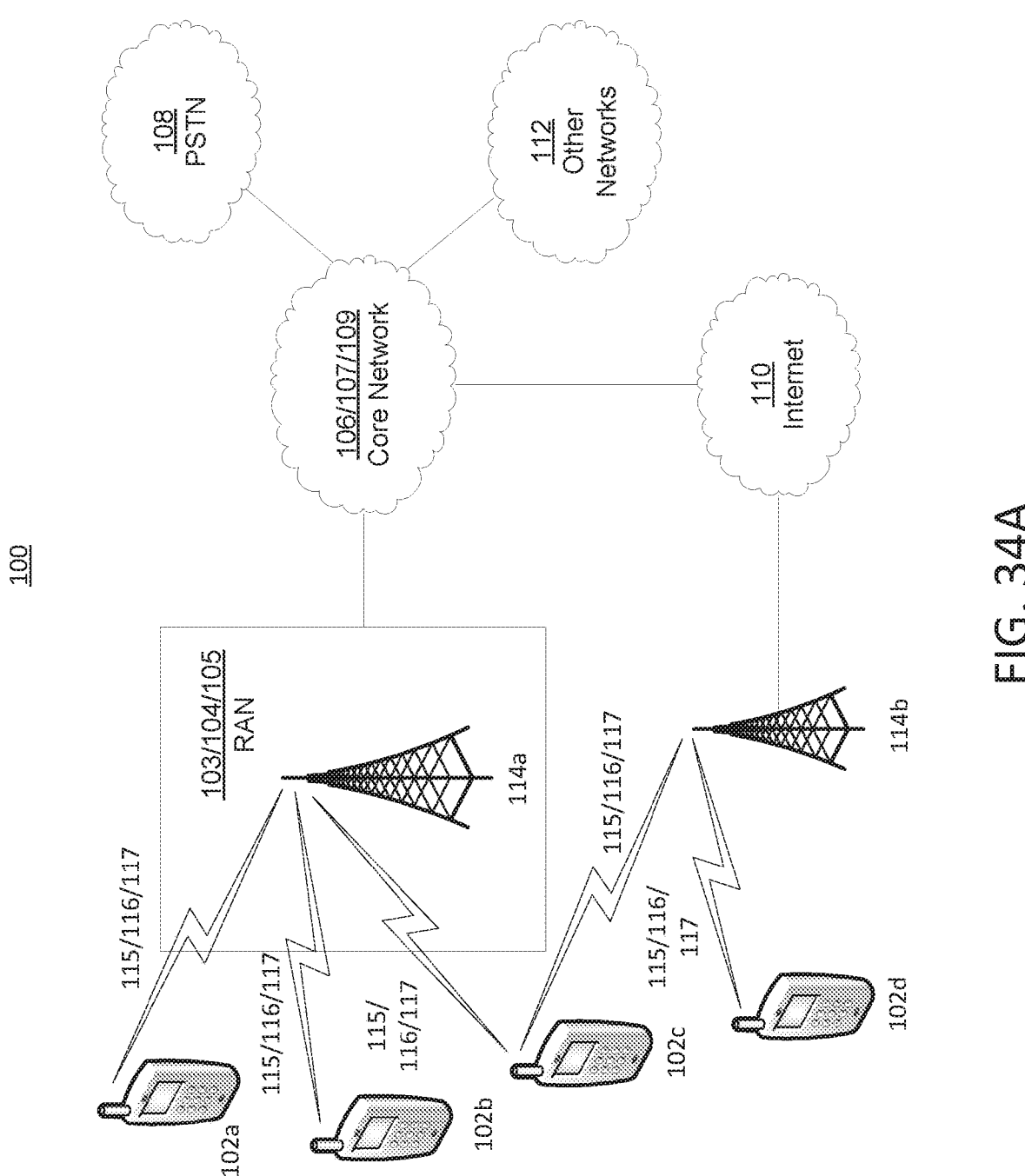
FIG. 34A depicts a diagram of an example communications system in which one or more disclosed embodiments may be implemented.

FIG. 34A depicts a diagram of an example communications system 100 in which one or more disclosed embodiments may be implemented and/or may be used. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 34A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 34A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 34A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 34A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 34A may be configured to communicate with the base station 114a, which may employ a cellular-based radio technology, and with the base station 114b, which may employ an IEEE 802 radio technology.

Figure 34B:
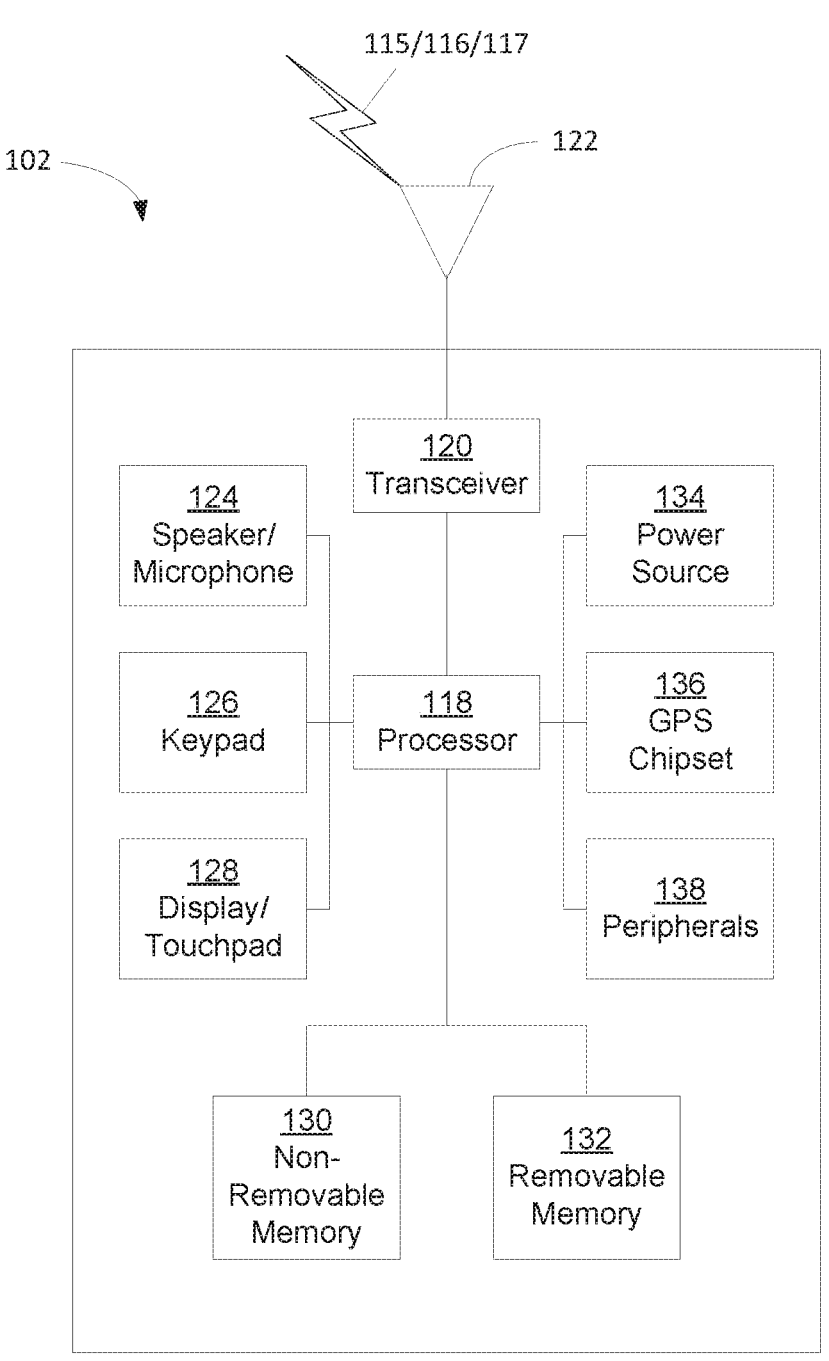
FIG. 34B depicts a system diagram of an example wireless transmit/receive unit (WTRU) that may be used within the communications system illustrated in FIG. 34A.

FIG. 34B depicts a system diagram of an example WTRU 102. As shown in FIG. 34B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 34B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 34B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 34B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 34C:
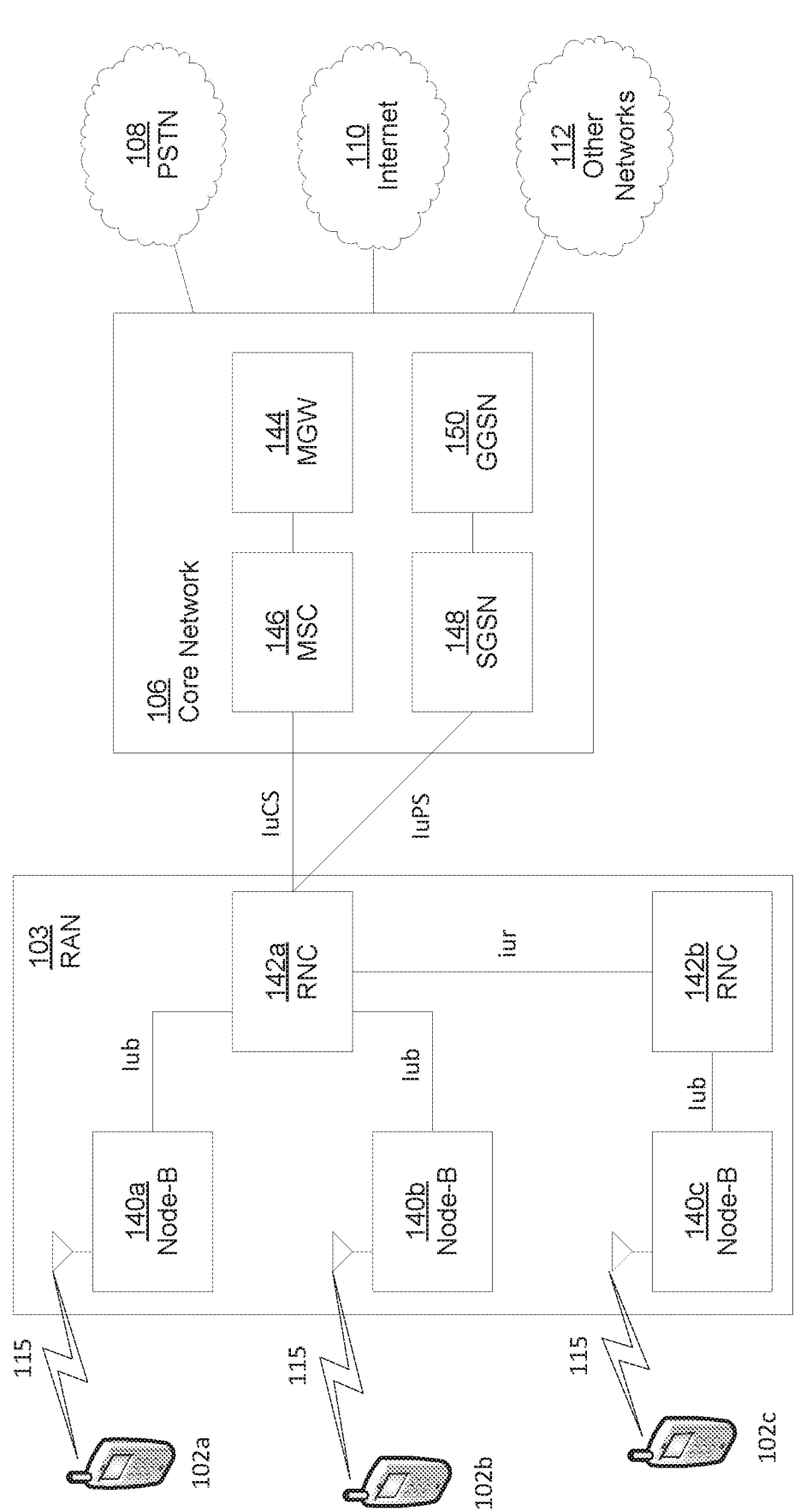
FIG. 34C depicts a system diagram of an example radio access network and an example core network that may be used within the communications system illustrated in FIG. 34A.

FIG. 34C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 34C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 34C, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 34C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 34D:
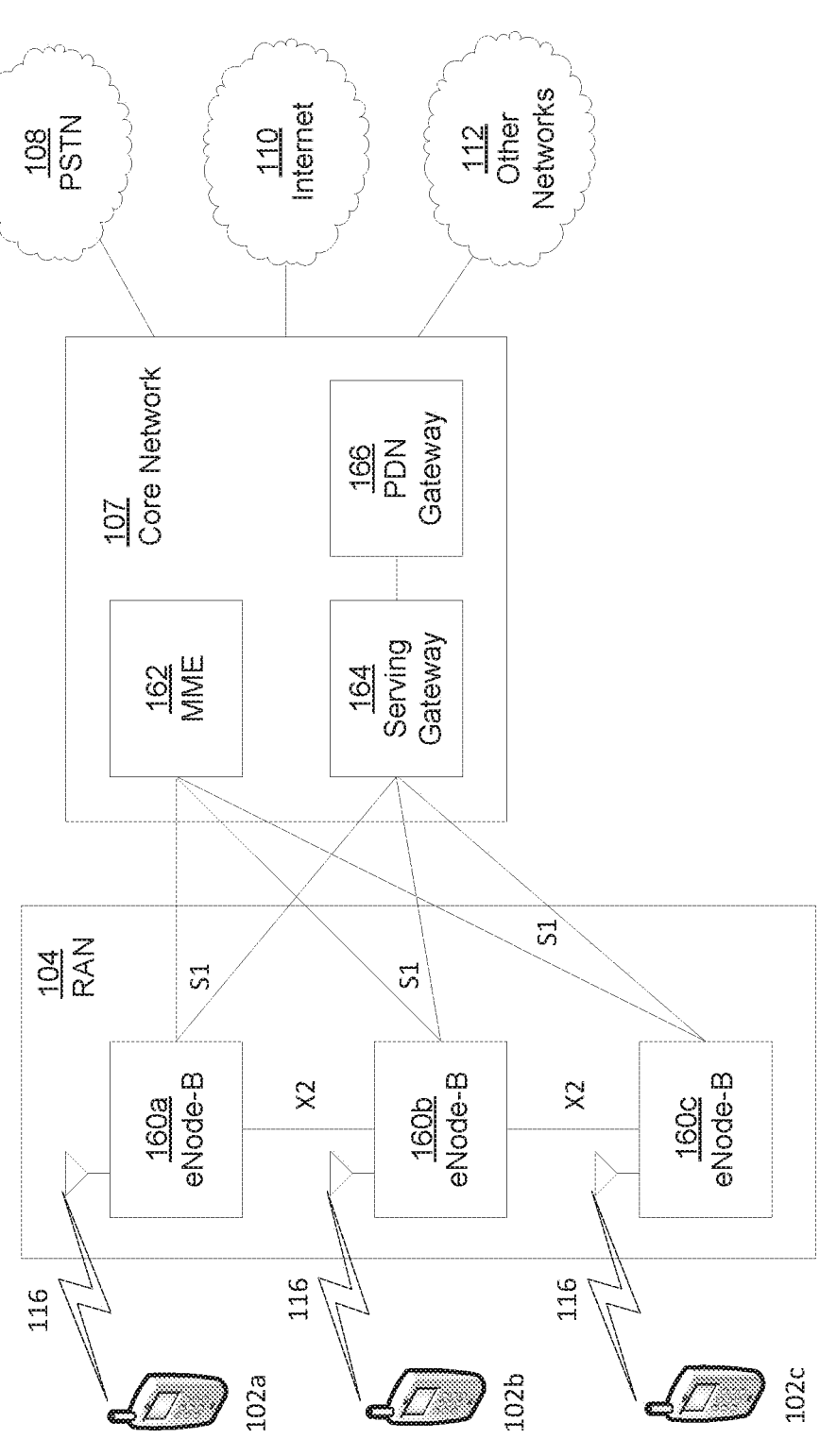
FIG. 34D depicts a system diagram of another example radio access network and an example core network that may be used within the communications system illustrated in FIG. 34A.

FIG. 34D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 34D, the eNode-Bs 160a, 160b, and/or 160c may communicate with one another over an X2 interface.

The core network 107 shown in FIG. 34D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 34E:
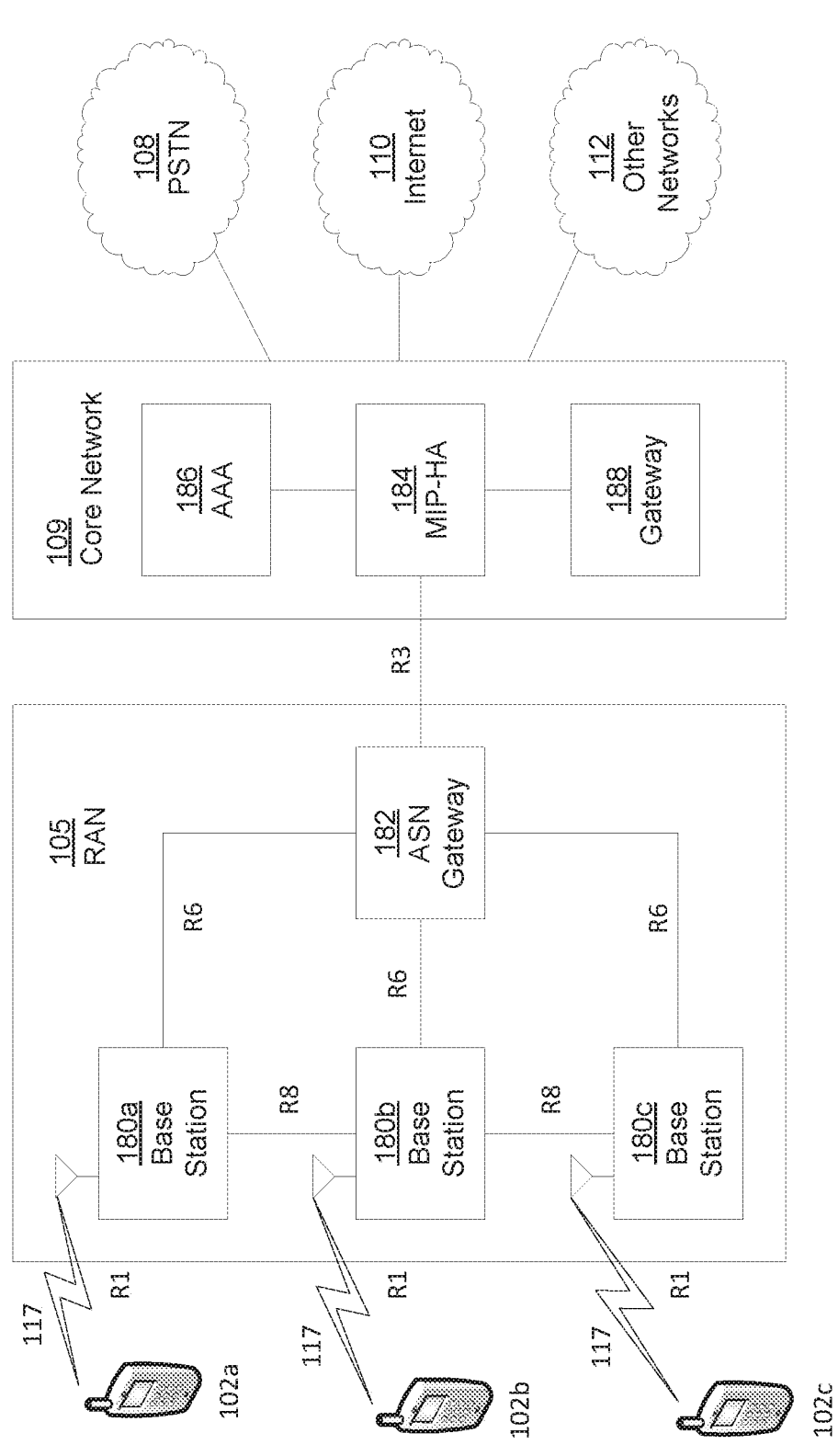
FIG. 34E depicts a system diagram of another example radio access network and an example core network that may be used within the communications system illustrated in FIG. 34A.

FIG. 34E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 34E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 34E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 34E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for video decoding comprising:
obtaining a video content, wherein the video content comprises a 360-degree video content, wherein the 360-degree video content is associated with a first projection format;
based on the obtained video content, identifying a current sample location, wherein the current sample location is associated with a current sample of the video content;
determining whether the current sample location is located at a content boundary;
based on a determination that the current sample location is located at the content boundary, obtaining a spatially neighboring sample location, wherein the spatially neighboring sample location is located outside of the content boundary and is spatially continuous to the current sample location; and
converting the first projection format to a second projection format based on the obtained spatially neighboring sample location.

2. The method of claim 1, wherein the spatially neighboring sample location is obtained based on a circular characteristic associated with the 360-degree video content.

3. The method of claim 1, wherein the first projection format comprises an equirectangular projection format and the second projection format comprises a cubemap projection format.

4. The method of claim 1, wherein the content boundary comprises at least one of a frame packed picture boundary or a face boundary.

5. The method of claim 1, wherein the video content is associated with a frame-packed picture comprises a plurality of faces that is associated with the first projection format, and wherein the method further comprises:
obtaining a first face that includes the current sample location;

obtaining a 3D position of the spatially neighboring sample location, wherein the spatially neighboring sample location is associated with the first face;
based on the 3D position of the spatially neighboring sample location, obtaining a second face that includes a padding sample location; and
applying a geometry projection with the 3D position of the spatially neighboring sample location to derive a 2D planar position of the spatially neighboring sample location in the second face as the padding sample location.

6. The method of claim 1, wherein the spatially neighboring sample location is associated with a spatially neighboring sample, and wherein the method comprises:
based on the obtained spatially neighboring sample location, determining that the spatially neighboring sample is misaligned with the current sample; and
based on the determination that the spatially neighboring sample is misaligned with the current sample, applying an interpolation filter to obtain the spatially neighboring sample.

7. The method of claim 1, wherein a spatially neighboring sample is associated with the spatially neighboring sample location and shares the same content boundary as the current sample.

8. An apparatus for video decoding comprising:
a processor configured to:
obtain a video content, wherein the video content comprises a 360-degree video content, wherein the 360-degree video content is associated with a first projection format;
based on the obtained video content, identify a current sample location, wherein the current sample location is associated with a current sample of the video content;
determine whether the current sample location is located at a content boundary;
based on a determination that the current sample location is located at the content boundary, obtain a spatially neighboring sample location, wherein the spatially neighboring sample location is located outside of the content boundary and is spatially continuous to the current sample location; and
based on the obtained spatially neighboring sample location, convert the first projection format to a second projection format.

9. The apparatus of claim 8, wherein the spatially neighboring sample location is obtained based on a circular characteristic associated with the 360-degree video content.

10. The apparatus of claim 8, wherein the first projection format comprises an equirectangular projection format and the second projection format comprises a cubemap projection format.

11. The apparatus of claim 8, wherein the content boundary comprises at least one of a frame packed picture boundary or a face boundary.

12. The apparatus of claim 8, wherein the video content is associated with a frame-packed picture comprises a plurality of faces associated with the first projection format, and wherein the processor is further configured to:
obtain a first face that includes the current sample location;
obtain a 3D position of the spatially neighboring sample location, wherein the spatially neighboring sample location is associated with the first face;

based on the 3D position of the spatially neighboring sample location, obtain a second face that includes a padding sample location; and apply a geometry projection with the 3D position of the spatially neighboring sample location to derive a 2D planar position of the spatially neighboring sample location in the second face as the padding sample location.

13. The apparatus of claim 8, wherein the spatially neighboring sample location is associated with a spatially neighboring sample, and wherein the processor is configured to:

based on the obtained spatially neighboring sample location, determine that the spatially neighboring sample is misaligned with the current sample; and based on the determination that the spatially neighboring sample is misaligned with the current sample, apply an interpolation filter to obtain the spatially neighboring sample.

14. A method for video encoding comprising:

obtaining a video content, wherein the video content comprises a 360-degree video content, wherein the 360-degree video content is associated with a first projection format;

based on the obtained video content, identifying a current sample location, wherein the current sample location is associated with a current sample of the video content;

determining whether the current sample location is located at a content boundary;

based on a determination that the current sample location is located at the content boundary, obtaining a spatially neighboring sample location, wherein the spatially neighboring sample location is located outside of the content boundary and is spatially continuous to the current sample location; and including the spatially neighboring sample location in video data.

15. The method of claim 14, wherein the spatially neighboring sample is configured to convert the first projection format to a second projection format.

16. The method of claim 15, and wherein the first projection format comprises an equirectangular projection format and the second projection format comprises a cubemap projection format.

17. The method of claim 14, wherein the spatially neighboring sample location is obtained based on a circular characteristic associated with the 360-degree video content.

18. The method of claim 14, wherein the content boundary comprises at least one of a frame packed picture boundary or a face boundary.

19. The method of claim 14, wherein the video content is associated with a frame-packed picture comprises a plurality of faces that is associated with the first projection format, and wherein the method further comprises:

obtaining a first face that includes the current sample location;

obtaining a 3D position of the spatially neighboring sample location, wherein the spatially neighboring sample location is associated with the first face;

based on the 3D position of the spatially neighboring sample location, obtaining a second face that includes a padding sample location; and deriving a 2D planar position of the spatially neighboring sample location in the second face as the padding sample location based on applying a geometry projection with the 3D position of the spatially neighboring sample location.

20. The method of claim 14, wherein a spatially neighboring sample is associated with the spatially neighboring sample location and shares the same content boundary as the current sample.

\* \* \* \* \*